United States Patent [19]
Schmidt et al.

[11] Patent Number: 5,640,371
[45] Date of Patent: Jun. 17, 1997

[54] METHOD AND APPARATUS FOR BEAM STEERING AND BESSEL SHADING OF CONFORMAL ARRAY

[75] Inventors: Mathew G. Schmidt, Houston; John F. Priest, Tomball, both of Tex.

[73] Assignee: Western Atlas International, Inc., Houston, Tex.

[21] Appl. No.: 562,299

[22] Filed: Nov. 22, 1995

Related U.S. Application Data

[63] Continuation of Ser. No. 216,648, Mar. 22, 1994, abandoned.

[51] Int. Cl.$^6$ .................................................. H04R 1/44
[52] U.S. Cl. ................................... 367/153; 367/912
[58] Field of Search ............................ 367/912, 911, 367/153, 162, 176, 152, 25, 180; 73/626; 310/326, 327, 334; 181/104

[56] References Cited

U.S. PATENT DOCUMENTS

| | | | |
|---|---|---|---|
| 3,697,937 | 10/1972 | Ingram | 367/25 |
| 4,516,583 | 5/1985 | Richard | 73/626 |
| 4,580,252 | 4/1986 | Mallett | 367/180 |
| 4,682,308 | 7/1987 | Chung | 367/912 |
| 4,833,360 | 5/1989 | Holly | 367/152 |
| 5,060,651 | 10/1991 | Kondo et al. | 73/626 |
| 5,089,989 | 2/1992 | Schmidt et al. | 367/911 |

*Primary Examiner*—Daniel T. Pihulic
*Attorney, Agent, or Firm*—Darryl M. Springs; William A. Knox

[57] ABSTRACT

This invention describes a methodology to image features using an array of multiple piezo-electric elements which employs the selective use of mechanical and electronic beam focusing, electronic beam steering and amplitude shading to increase resolution and overcome side lobe effects. This invention introduces a novel signal reconstruction technique utilizing independent array element transmission and reception, creating focusing and beam steering. Application of the methodology can be used in wireline, measurement while drilling, pipe and pipeline and medical applications. Applications include, but are not limited to Bore hole Caliper, Bore hole Geometry, Bore hole Imaging, Casing Inspection, Cement Evaluation and Volumetric Scanning Applications (e.g. Fluid, Behind Casing and Open Hole). The configuration of the transducer array is preferably cylindrical, but may be conical, biconical, convex, concave or may take the form of a number of suitable geometric configurations. The transducer array may incorporate a transformer block having an array of multiple transformers therein for connection to individual transducer circuits. The transformers may be fixed or capable of being mechanically tuned as desired.

45 Claims, 11 Drawing Sheets

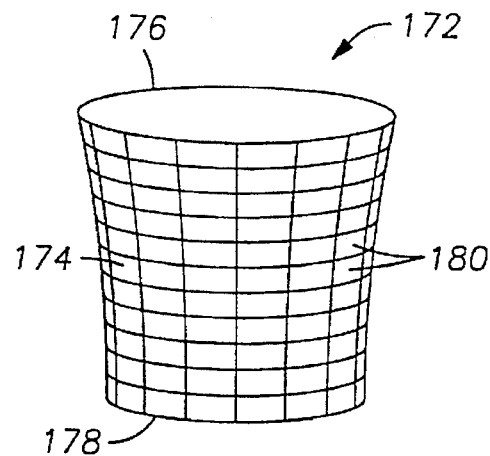
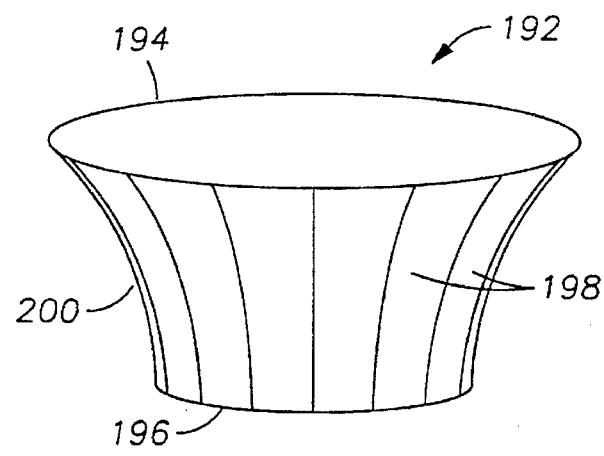
FIG. 14   FIG. 16
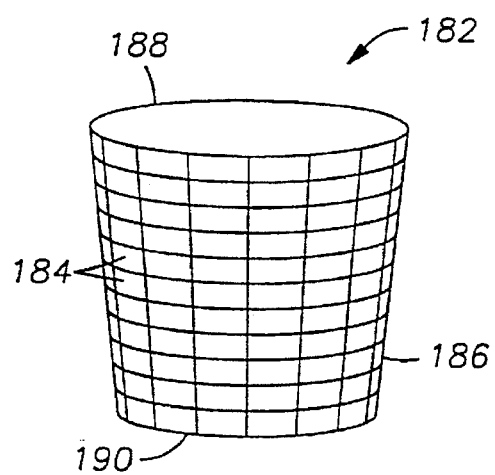
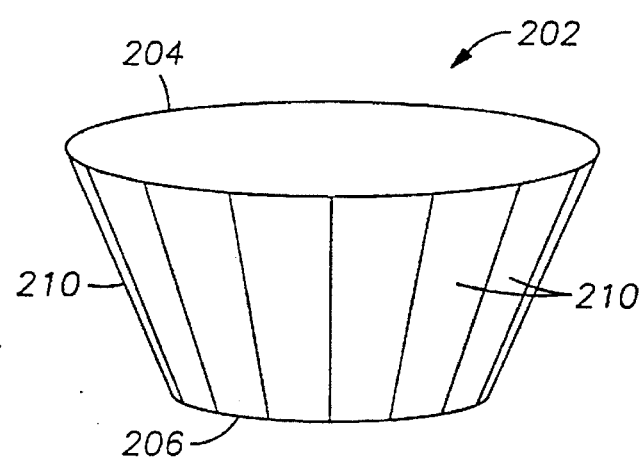
FIG. 15   FIG. 17

METHOD AND APPARATUS FOR BEAM STEERING AND BESSEL SHADING OF CONFORMAL ARRAY

This is a continuation of application Ser. No. 08/216,648 filed Mar. 22 1994, now abandoned.

FIELD OF THE INVENTION

This invention relates generally to a method and apparatus for acoustic bore hole logging in wells such as for the production of petroleum products and more particularly describes a methodology to image features using a cylindrical array of piezo-electric elements. This method employs the use of mechanical and electronic beam focusing, electronic beam steering and amplitude shading to increase resolution and overcome side lobe effects. Even more specifically, the present invention introduces a novel signal reconstruction technique utilizing independent array element transmission and reception, creating focusing and beam steering. The present invention has application in wireline, measurement while drilling, pipe and pipeline application and medical applications. The applications of the invention include, but are not limited to bore hole caliper, bore hole geometry, bore hole imaging, casing inspection, cement evaluation and volumetric scanning applications (e.g. fluid, behind casing, open hole).

BACKGROUND OF THE INVENTION

This invention relates to methods and apparatus for determining the disposition of earth strata traversed by a bore hole and concerns improved methods and apparatus using acoustic pulse energy transmission in fluid filled bore holes for detecting the angle and azimuthal direction of the dip of earth formations.

It is conventional practice to use a dip meter for determining the angle and azimuthal direction of the dip or the inclination of the earth formation strata traversed by a bore hole. One common form of dip meter makes simultaneous resistivity measurements at three or four equally spaced electrodes in a plane perpendicular to the axis of the bore hole. The electrodes provide a log of the resistivity of the surrounding formation as the electrodes traverse the bore hole wall. The logs from all of the resistivity electrodes are correlated in order to derive the relative displacement along the bore hole of the points of intersection with the plane of the formation geological dip. Inertial sensors with the dip meter provide additional information relating to the direction and slant of the bore hole and the rotational attitude of the tool itself.

Resistivity dip meters, while effective in bore holes without fluids or in water filled bore holes, have not been particularly effective in bore holes containing oil-based drilling mud. This is primarily due to the insulating quality of the oil-base drilling fluid since effective resistivity logging depends on the conductivity or resistivity measurement obtained through the drilling fluid and the insulating layer of mud cake adhering to bore hole wall. To overcome this problem to a degree special "scratcher" and "poller" electrodes have been employed to scrape through the insulating layer of mud cake and then make contact with the formation in order to make the resistivity measurement. Such attempts have the objective to optimize the electrical contact of the electrode with the bore hole wall. However, these attempts have met with varying degrees of success, often producing intermittent dip information.

Attempts have been made to use acoustical energy in obtaining information in order to determine formation dip measurements. The need is not for an absolute measurement but for a well log which can determine the change or transition from one earth stratum or formation to another. Attempts have been made to transmit acoustic pulse energy into the formation from a transducer in contact with the bore hole wall and then to measure the transition time of the acoustic energy through the formation to spaced receiving transducers also in contact with the bore hole wall. Other attempts have been made to direct the acoustic pulse energy at the bore hole wall/formation interface and to measure the acoustic pulse energy reflected therefrom, which would be indicative of the acoustic impedance of the formations. In both cases above described, however, it is not possible to place the acoustic transmitting transducer in continuous direct contact with the bore hole wall because of the random wall geometry that occurs during drilling, and any invasion of the oil-base drilling fluid between the transducers and the bore hole wall/formation interface will introduce some attenuation in the acoustic pulse energy. It has been found the heavier the "weight" of the oil-base mud, the greater the attenuation of the acoustic energy, due to scattering produced by the "weighting" material, such as barite or hematite, and the viscosity of the oil-base mud. In addition, in a pulse-echo configuration, the "noise" generated by the ringing decay of the transmitting transducer complicates the detection and accurate determination of the reflected acoustic pulse energy. If a "delay line" spacing is built into the transducer design between the transducer crystal and the bore hole fluid, such as a "delay line" to delay the transducer ringing, the delay line also introduces additional reflection and transmission losses. Further, in the first case described above, the acoustic pulse "travel" through the formation itself to the receiving transducers introduces additional attenuation. In many cases acoustic transducers are intended to substantially contact the bore hole wall and to remain in static position for respective transducer pulses. U.S. Pat. No. 5,146,050 of Strozeski, et al. evidences this general type of acoustic formation dip logging instrument. In other cases, as evidenced by U.S. Pat. No. 5,001,676 of Broding, an acoustic transducer is rotatably mounted within a transducer housing and is typically rotated 360° by a motor and shaft at a rotational velocity of from 100 to 400 rpm while the transducer is pulsed in the range of about 2000 cycles per second. Utilization of a rotary acoustic transducer of this nature requires a complex transducer design which makes it both expensive to manufacture and troublesome to use. Accordingly, it is desirable to provide a bore hole logging instrument having a high pulse rate and yet having a simplified and trouble free transducer design.

SUMMARY OF THE INVENTION

In accordance with one principle of this invention, method and apparatus are provided for acoustically logging earth formations surrounding a bore hole containing a fluid, by means of a down hole logging instrument adapted for longitudinal movement through the bore hole. An acoustic transducer assembly is provided within the logging instrument and incorporates a cylindrical array of piezo-electric elements with the array being fixed within the housing structure. The method according to the preferred embodiment of this invention employs the use of mechanical and electronic beam focusing, electronic beam steering, and amplitude shading to increase resolution and overcome side lobe effects. This invention introduces a novel signal reconstruction technique utilizing independent array element transmission and reception, creating focusing and beam steering. Application of the methodology can be used in wireline measurement while drilling, pipe, pipeline applications and medical applications. From the standpoint of well drilling, applications of the invention include but are not limited to bore hole caliber, bore hole geometry, bore hole imaging, casing inspection, cement evaluation and volumetric scanning (e.g. fluid, behind casing, open hole).

Although the preferred embodiment of this invention incorporates a cylindrical array of rectilinear piezo-electric elements, this invention is not limited to such. It should be born in mind that the scope of this invention is intended to encompass arrays of multiple piezo- electric elements of differing configuration, such as conical, biconical, curved, etc. Briefly this invention describes the methodology to image features using a cylindrical or conical array of piezo electric elements configured as, but not limited to, one of the following:

Cylindrical Arrays:
  (1) A set N equal width rectilinear elements aligned along the cylindrical axis of the array whose length is equal to the array height, where N is an arbitrary number of elements.
  (2) A set of N times M equal length and width rectilinear elements aligned along the cylindrical axis of the array, where N is the number of elements around the array, and M in the number of elements along the array axis.
  (3) A set of N equal width curved transducer elements having a geometric radius R parallel to the axis of the array (creating a focal distance F), aligned along the axis of the array, whose length is equal to the array height.
  (4) A set of N times M unequal size rectilinear elements aligned along the cylindrical axis of the array, where N is the number of elements around the array, and M is the number of elements along the array axis.
  (5) A set of N time M unequal length and width curved transducer elements having a geometric radius R parallel to the axis of the array (creating a focal distance F), aligned along the axis of the array, whose length is equal to the array height.
  (6) A set of N times M unequal length and width curved transducer elements having a geometric radius R parallel to the axis of the array (creating a focal distance F), aligned along the axis of the array mounted such that their surface lies on the geometric surface of radius R, whose length is equal to the array height.
  (7) A set of N times M rectilinear transducer elements arranged such that the long dimension of each element is perpendicular to the array axis, where N is the number of elements arranged around the array axis, and M is the number of elements along the array axis.
  (8) A set of N times M curved, unequal length and width transducer elements arranged such that the long dimension is perpendicular to the array axis, where N and M are defined in (7) above. The curvature of the array defines a physical focusing in the direction perpendicular to the array axis.

Conical Arrays (The cylindrical array described above is a special case of the more general conical array). The surface of the cylindrical array can be described by a surface of revolution of a circle of radius R about the array axis, where the radius is perpendicular to the array surface. The conical array surface is a frustrum of a cone (called cone in the description which follows) described by a surface of revolution about the array axis described by a circle of radius R, where the radius is not perpendicular to the array axis. A linear surface can be described by an infinite radius R. The conical transducer arrays include:

(1) A set of N equal width rectilinear elements laying on the surface of the cone, aligned along the cylindrical axis of the array whose length is equal to the array height, where N is an arbitrary number of elements.
  (2) A set of N times M equal length and width rectilinear elements laying on the surface of the cone, aligned along the cylindrical axis of the array, where N is the number of elements around the array, and M in the number of elements along the array axis.
  (3) A set of N equal width curved transducer elements laying on the surface of the cone having a geometric radius R parallel to the axis of the array (creating a focal distance F), aligned along the axis of the array, whose length is equal to the array height.
  (4) A set of N times M unequal size rectilinear elements laying on the surface of the cone, aligned along the cylindrical axis of the array, where N is the number of elements around the array, and M in the number of elements along the array axis.
  (5) A set of N time M unequal length and width curved transducer elements having a geometric radius R parallel to the axis of the array (creating a focal distance F), laying on the surface of the cone and being aligned along the axis of the array, whose lengths are equal to the array height.
  (6) A set of N time M unequal length and width curved transducer elements having a geometric radius R parallel to the axis of the array (creating a focal distance F), laying on the surface of the cone, aligned along the axis of the array mounted such that their surface lies on the geometric surface of radius R, whose length is equal to the array height.
  (7) All of the above with the trapezoidal element widths which increase along conic surface, maintaining equal spacing between elements.
  (8) A set of N times M rectilinear transducer elements laying on the surface of the cone, arranged such that the long dimension of each element is perpendicular to the array axis, where N is the number of elements arranged around the array axis, and M is the number of elements along the array axis.
  (9) A set of N times M curved, unequal length and width transducer elements laying on the surface of the cone and being arranged such that the long dimension thereof is perpendicular to the array axis, where N and M are defined in (7) above. The curvature defines a physical focusing in the direction perpendicular to the local conic surface axis.

The array shall be utilized in the following configurations:
  (1) Single Array.
  (2) Dual Array.
    (a) Cylindrical
    (b) Biconical, apex of cones pointing toward other conical array.
    (c) Biconical, apex of cones point away from other conical array
  (3) Multiple arrays, of any combination of (1) and (2) above.

In the following discussion, the axial direction is the direction along the axis of the array, the orthogonal direction is a plane orthogonal to the axis of the array. In the case of the conical arrays, the orthogonal surface described is a conical surface perpendicular to the surface of the conic section (at its center if the element surface is curved).

Mechanical Focusing:

The array may be focused in either the axial or orthogonal direction either by the cylindrical curvature of the elements, or by acoustic lensing for all arrays. N×M arrays may or may not have mechanical focusing.

Electronic Focusing:

Focusing in the arrays shall be accomplished by electronically by developing a virtual focal surface by providing the appropriate delays to the electrical stimuli of each element of the array. The array focusing may be either axial or orthogonal, or in the case of N×M arrays may be focused electronically in both the axial and orthogonal directions. In the case of axial or orthogonal focusing, the orthogonal or axial axis may be mechanically focused.

Mechanical Steering:

Mechanically focused arrays shall not have variable steering capabilities in the direction controlled by the mechanical focus. A single steering direction shall be defined by mechanical shape in the axial direction or orthogonal direction. A cylindrical array shall transmit acoustic pulse signals perpendicular to the array axis. A conical array shall transmit over a surface perpendicular to the surface of the cone, at an angle relative to the axis of the array determined by the slope of the conic surface (for curved conical elements, the angle is defined at the center of the element).

Electronic Steering:

Steering in the arrays shall be accomplished by electronically by developing a virtual focal surface by providing the appropriate delays to the electrical stimuli of each element of the array to the point the output signal in the desired steering direction. The array steering may be either axial or orthogonal, or in the case of N×M may be steered in all directions. In the case of axial or orthogonal steering, the orthogonal or axial axis shall be mechanically steered to a fixed surface.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention are therefore not to be considered limiting of its scope, for the invention may admit to other equally effective embodiments.

IN THE DRAWINGS

Figure 1:
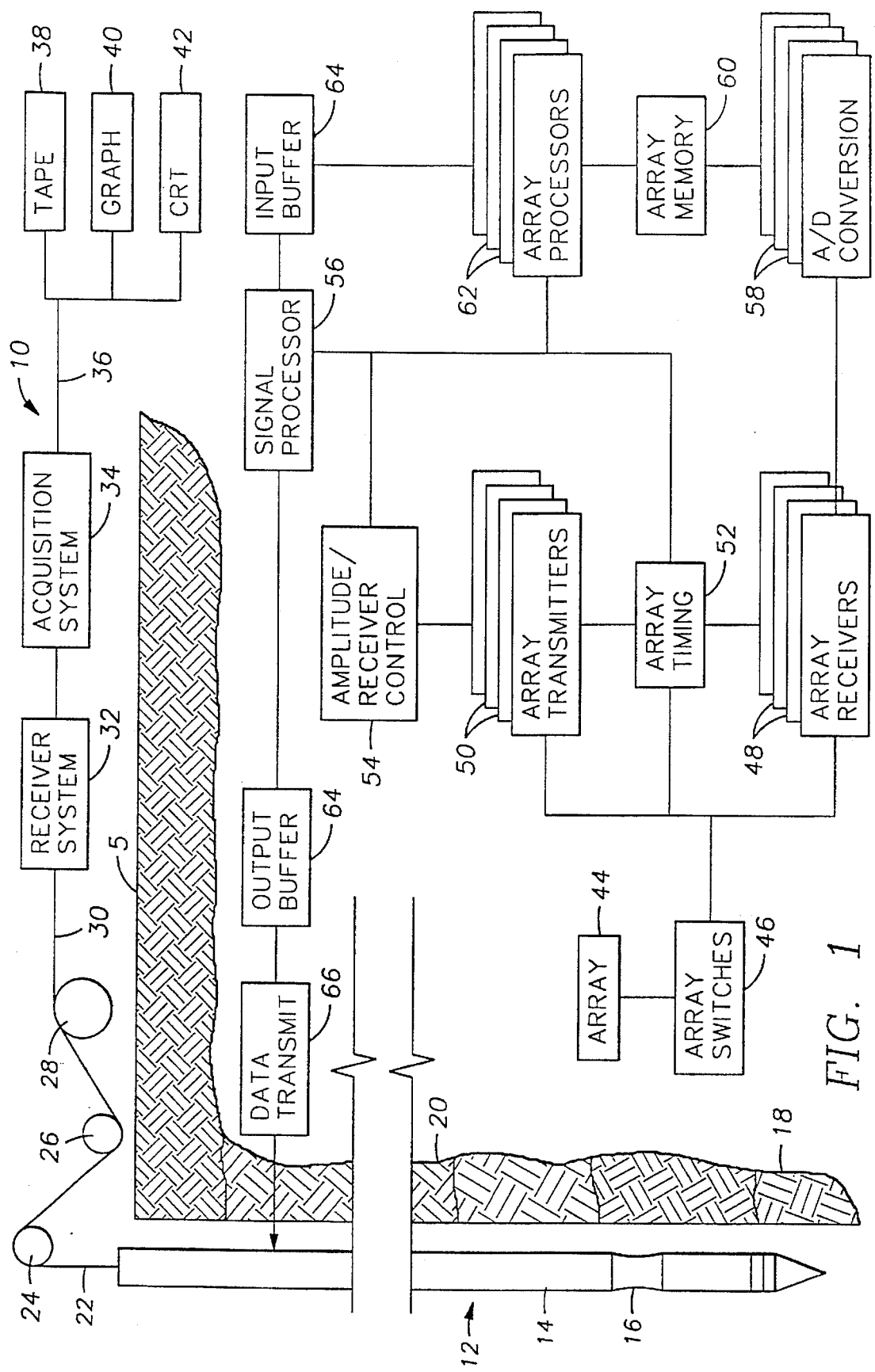

FIG. 1 is a diagrammatic and block diagram schematic illustration of method and apparatus for beam steering and bessel shading of a conformal array according to the teachings of this invention.

Figure 2:
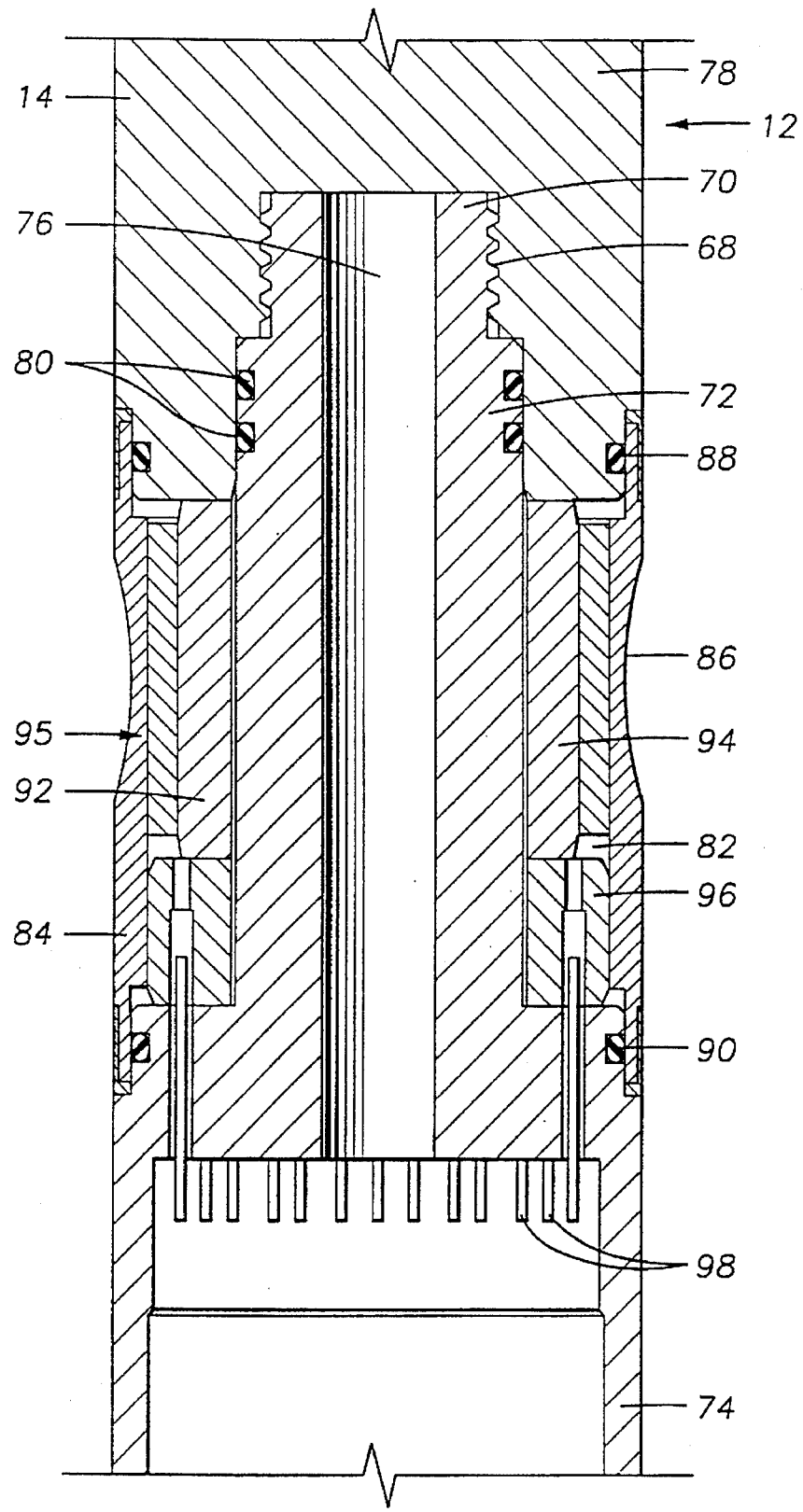

FIG. 2 is a sectional view of a portion of the acoustic well logging sonde of FIG. 1 showing a multiple piezo-electric element cylindrical array incorporated within a sub of the sonde.

Figure 3:
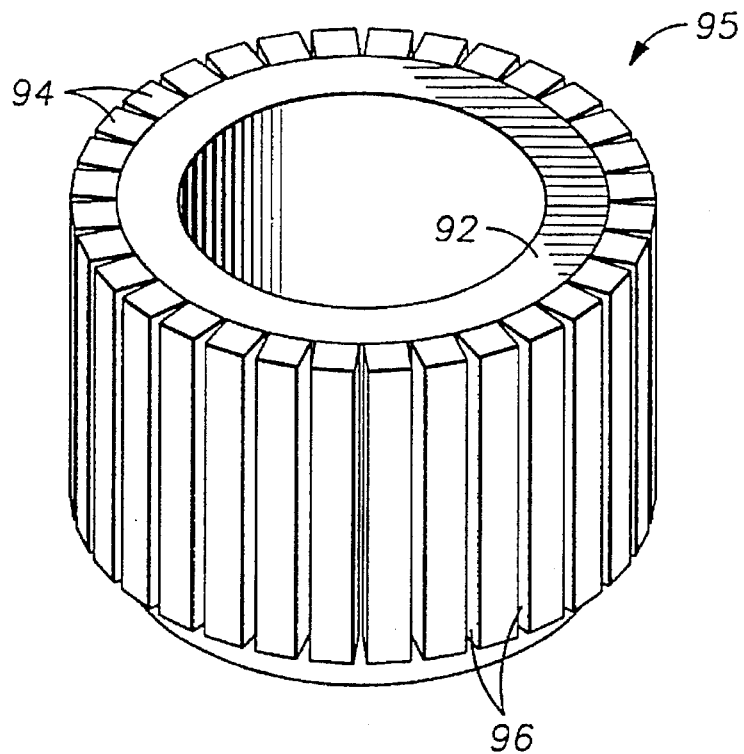

FIG. 3 is an isometric illustration of a thirty-two element cylindrical piezo-electric array such as is incorporated within the sonde sub of FIG. 2.

Figure 4:
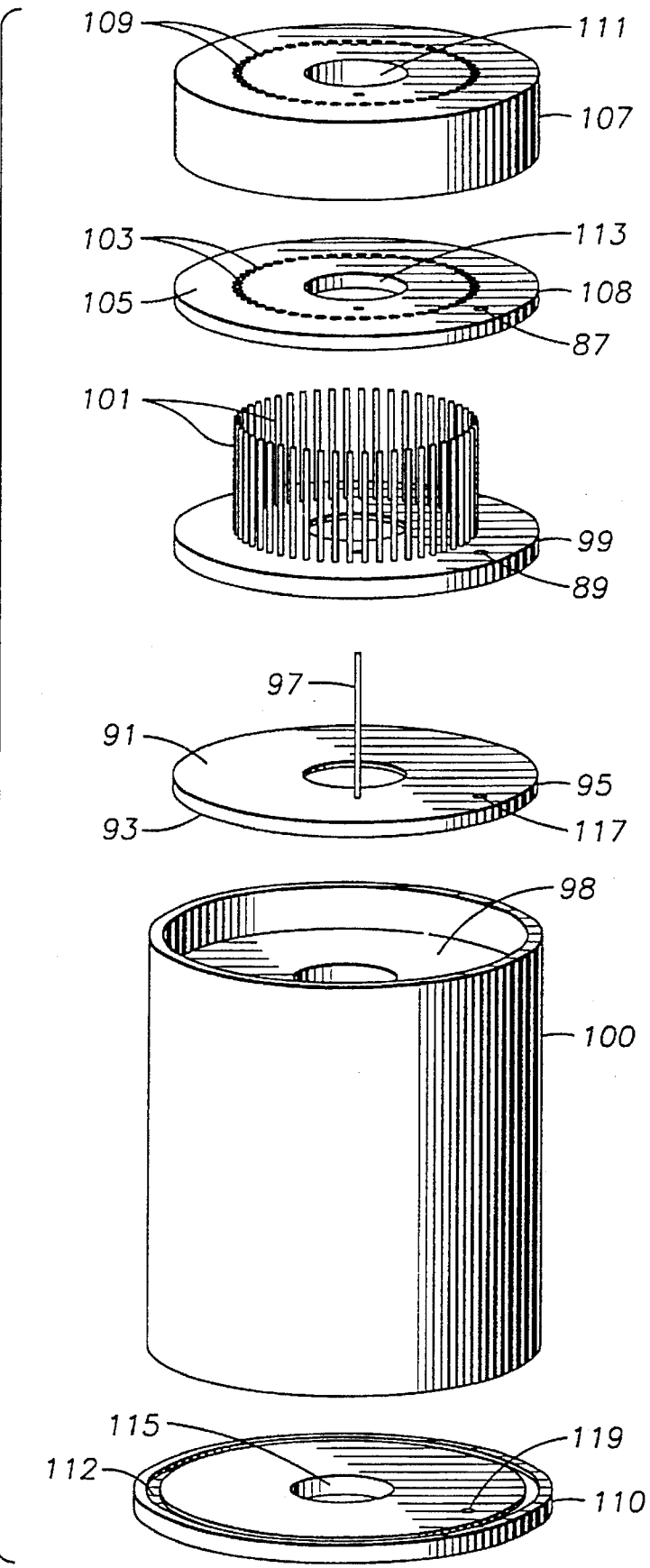

FIG. 4 is an exploded isometric illustration similar to that of FIG. 3 and illustrating an initial stage in the manufacture of a sixty-four element cylindrical piezo-electric array constructed in accordance with this invention.

Figure 5:
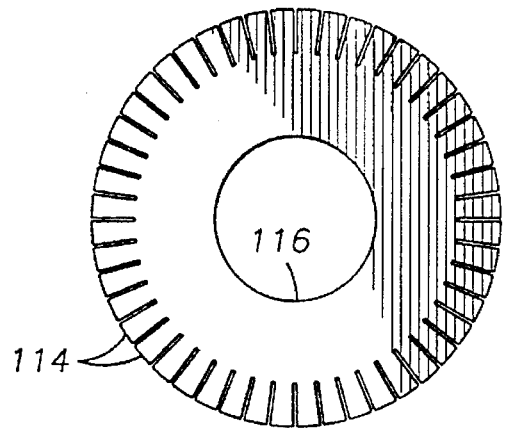
Figure 6:
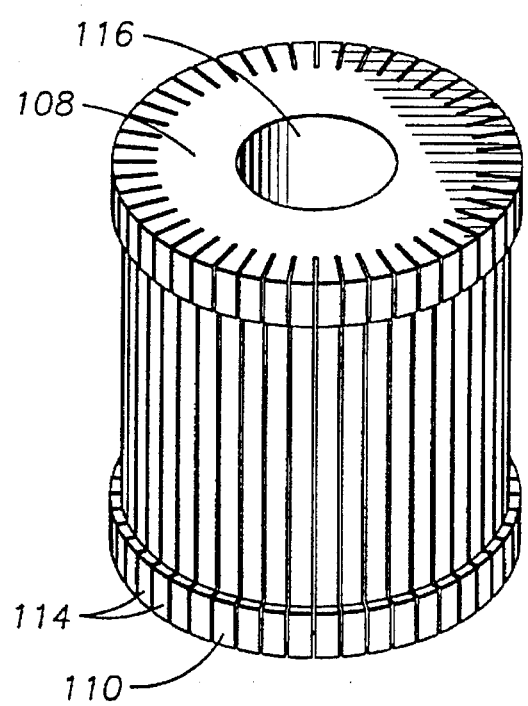

FIG. 5 is a plan view of the sixty-four element array of FIGS. 4 and 6.

FIG. 6 is an isometric illustration of a sixty-four element piezo-electric array upon completion of the manufacturing process therefor.

Figure 7:
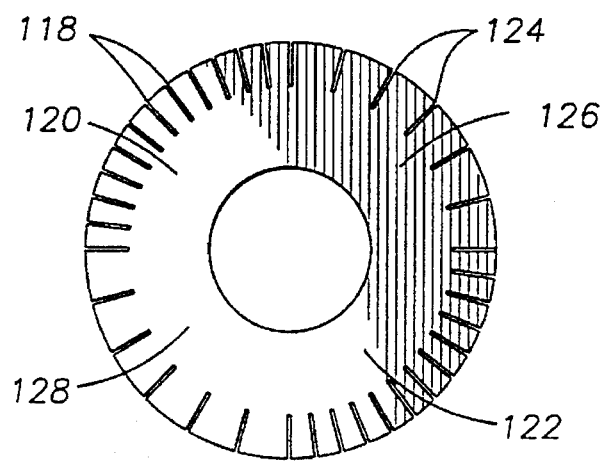

FIG. 7 is a plan view of a piezo-electric transducer array embodying the present invention and having piezo-electric transducers of unequal dimension.

Figure 8:
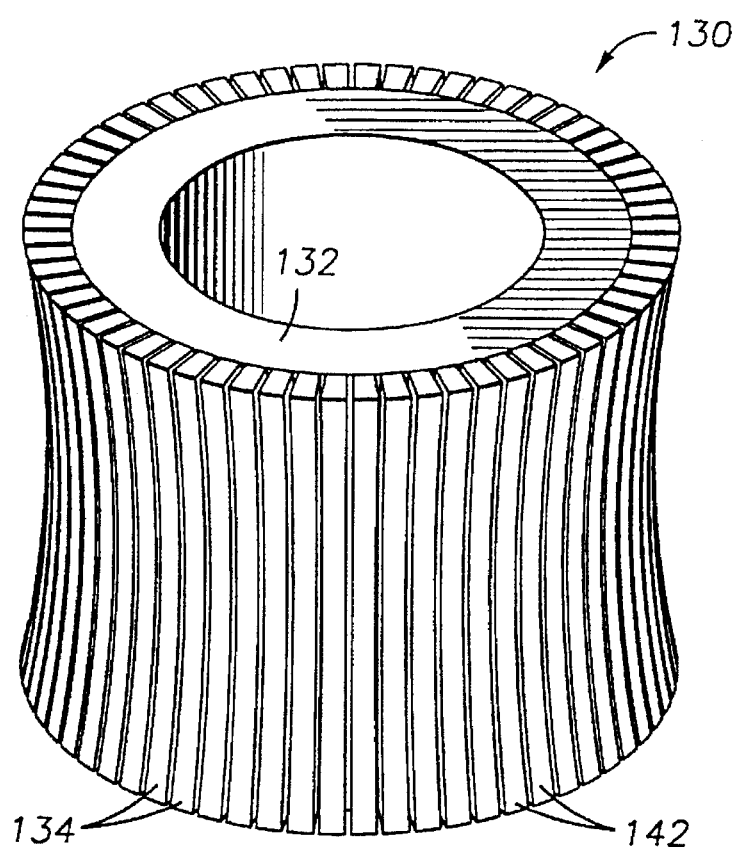

FIG. 8 is an isometric illustration similar to that of FIGS. 3 and 6 and showing a curved piezo-electric array.

Figure 9:
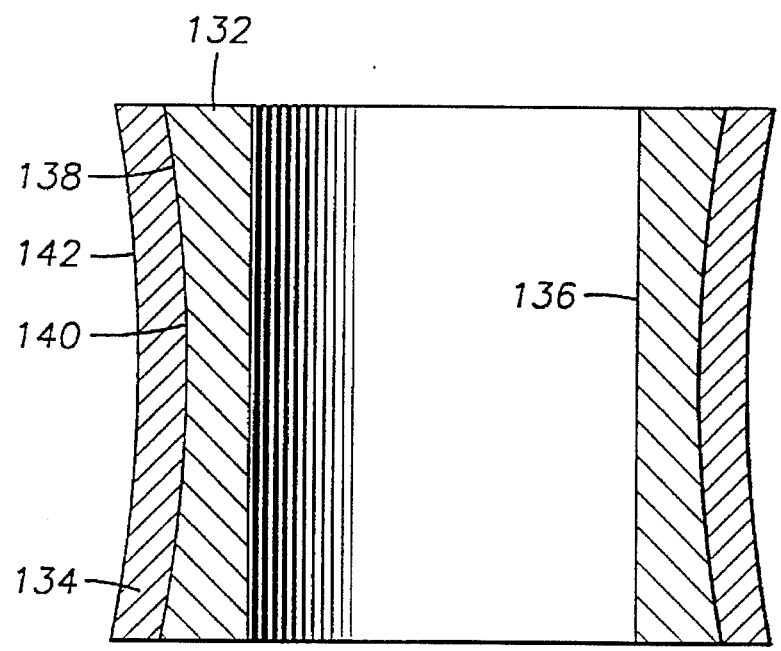

FIG. 9 is a sectional view taken along line 9—9 of FIG. 8.

Figure 10:
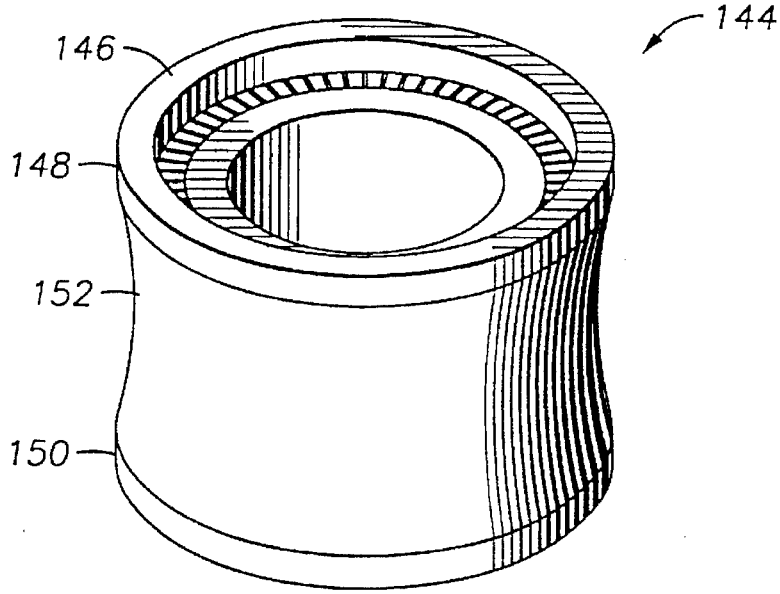

FIG. 10 is an isometric illustration of a cylindrical piezo-electric array being located within a generally cylindrical acoustic window having a mechanical focusing capability.

Figure 11:
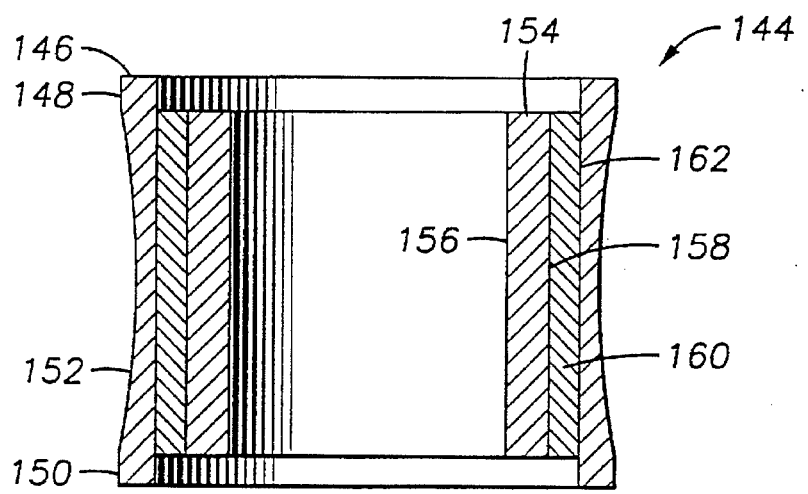

FIG. 11 is a sectional view taken along line 11—11 of FIG. 10.

Figure 12:
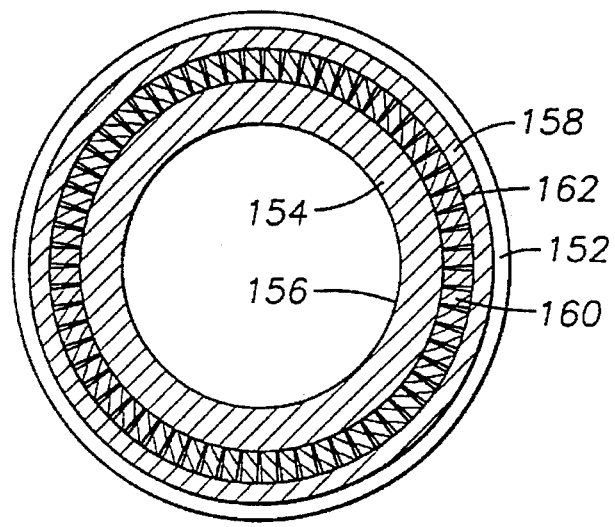

FIG. 12 is a sectional view taken along line 12—12 of FIG. 11.

Figure 13:
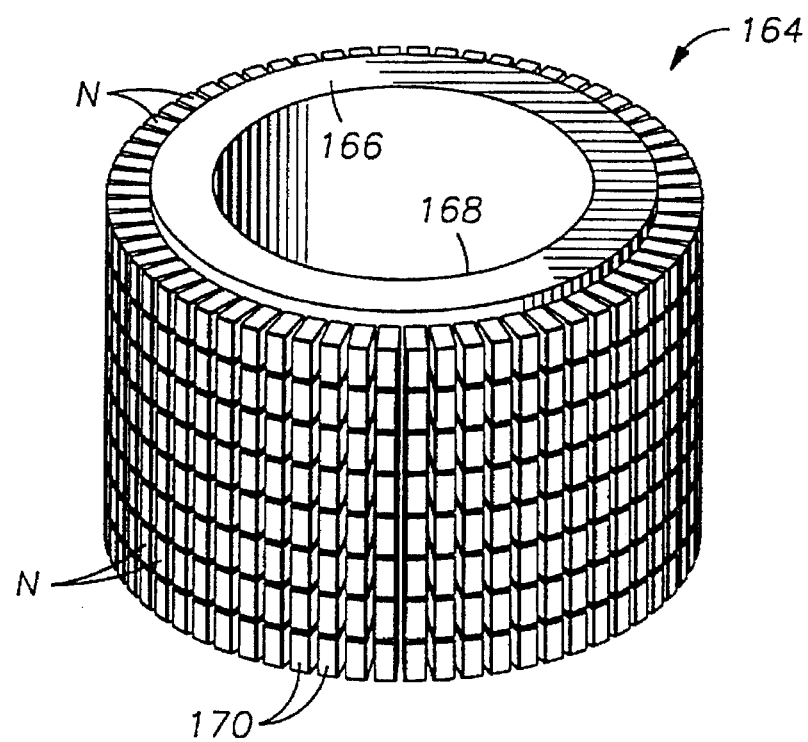

FIG. 13 is an isometric illustration of a generally cylindrical piezo-electric acoustic array incorporating stacked circularly oriented tiers of piezo-electric elements arranged about a backing substrate.

FIG. 14 is an isometric illustration of a convexly curved array of piezo-electric elements arranged to provide an array of convex configuration for the purpose of mechanical focusing.

FIG. 15 is an isometric illustration of a generally conical piezo-electric array having multiple piezo-electric elements arranged to present an external form of conical configuration.

FIG. 16 is an isometric illustration presenting a tapered convexly curved piezo-electric array having ends of differing dimension.

FIG. 17 is an isometric illustration showing a plurality of piezo-electric elements arranged in generally conical configuration having its larger dimension defining the upper end of the array.

Figure 18:
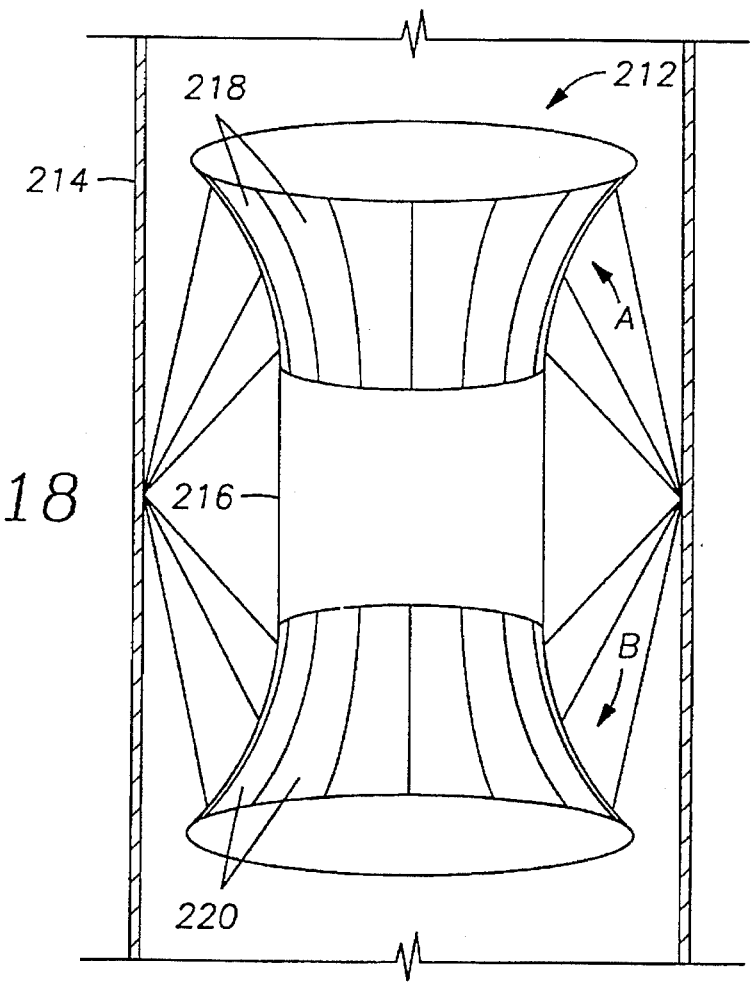

FIG. 18 is an isometric illustration showing a piezo-electric array constructed in accordance with this invention and incorporation curved upper and lower intermediate surfaces spaced apart by a generally cylindrical section and defining an array concept for the purpose of focusing.

Figure 19:
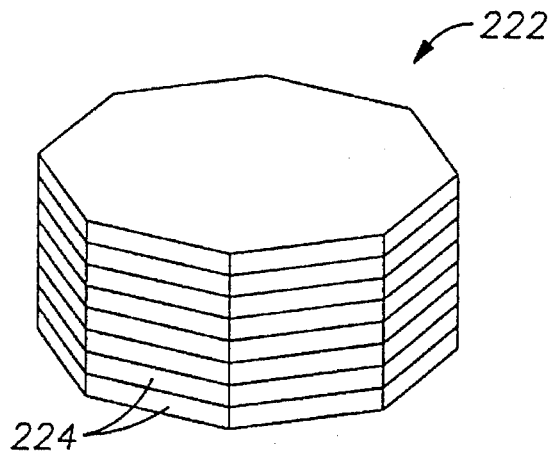

FIG. 19 is an isometric illustration of a piezo-electric array constructed in accordance with the present invention and having a plurality of tiers of piezo-electric elements each being in the form of an octagon.

Figure 20:
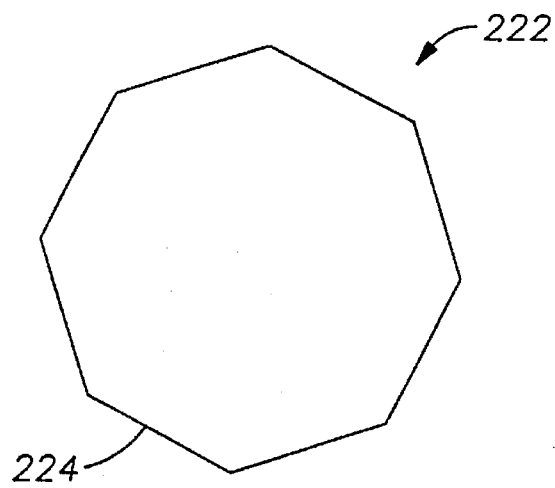

FIG. 20 is an a plan view of the piezo-electric array of FIG. 19.

Figure 21:
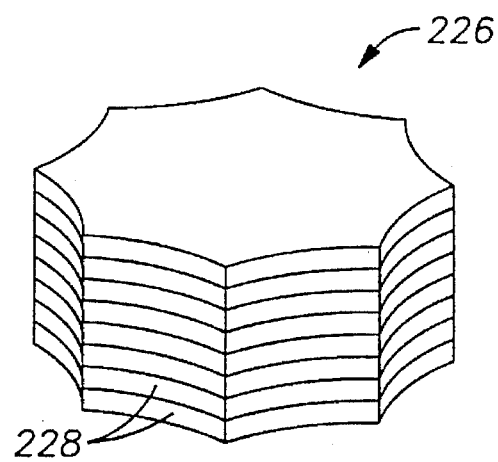

FIG. 21 is an isometric illustration of a piezo-electric array having a plurality of tiers of piezo-electric elements defining an eight sided array structure presenting convectionally curved external signal focusing surfaces.

Figure 22:
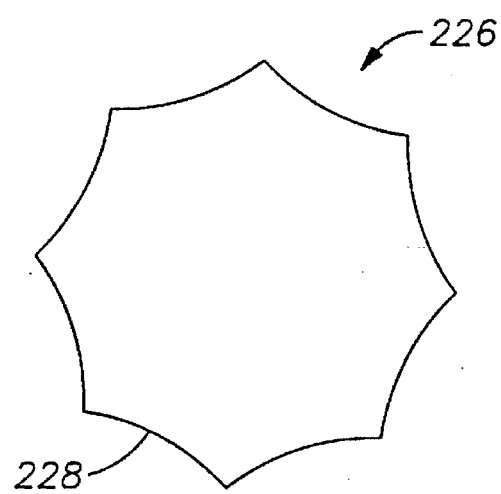

FIG. 22 is a plan view of the piezo-electric array of FIG. 21.

Figure 23:
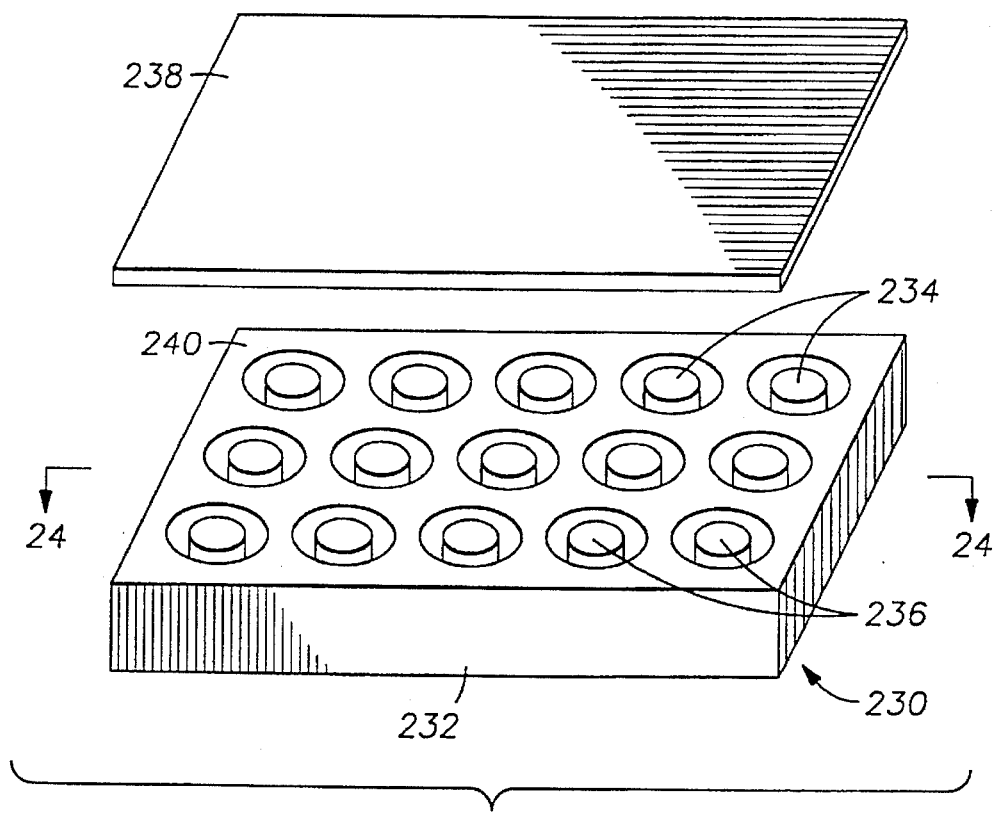

FIG. 23 is an exploded isometric illustration of a transformer block having multiple transformers and which could be employed as shown in FIG. 4.

Figure 24:
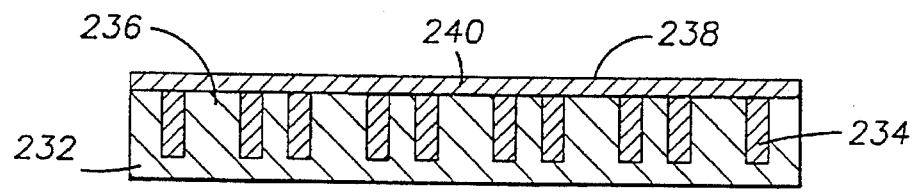

FIG. 24 is a sectional view taken along line 24—24 of FIG. 23.

Figure 25:
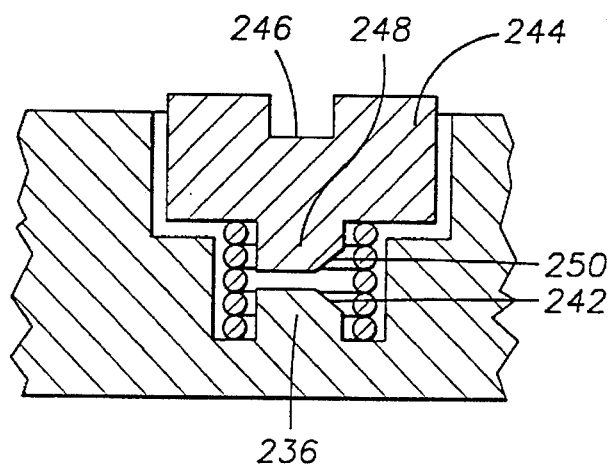

FIG. 25 is a fragmentary sectional view of a transformer having the capability of being tuned.

Figure 26:
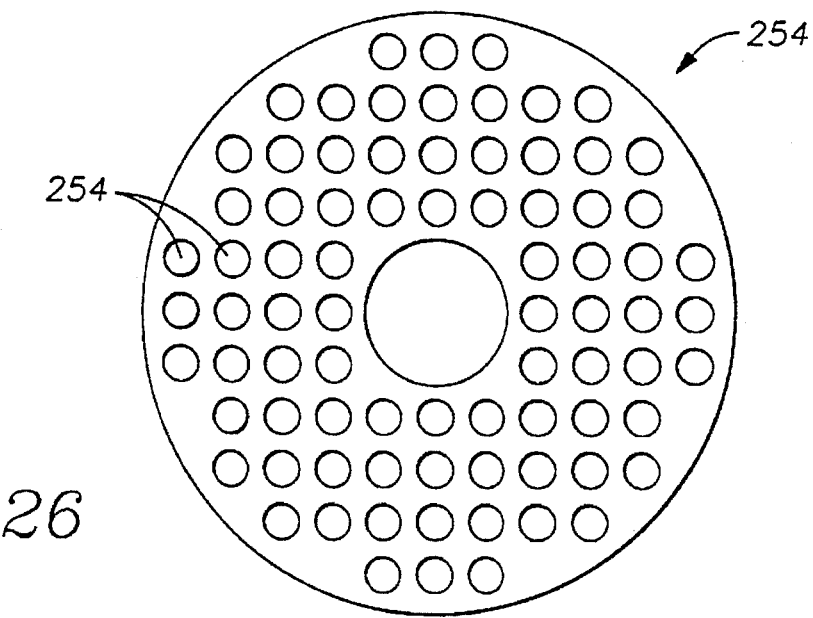

FIG. 26 is a plan view of a transformer block similar to that shown in FIG. 4.

DETAILED DESCRIPTION OF PREFERRED EMBODIMENT

Referring now to the drawings and first to FIG. 1 a block diagram schematic illustration of an acoustic bore hole logging sonde in the down hole environment is shown together with its data transmitting and receiving systems generally at 10. The acoustic bore hole logging sonde is shown generally at 12 and is generally defined by a sonde housing 14 having an acoustically transparent or "window" section 16 through which acoustic signals are propagated to the bore hole wall 18 and into the surrounding earth formation 20 which is traversed by the bore hole. As shown the sonde 12 is supported by a wireline cable 22 which extends about sheaves 24 and 26 to a cable drum 28. The electrical conductors 30 of the wireline cable establish a data transfer link with a receiver system 32 and a data acquisition system 34. The data acquisition system is provided with an output 36 to which is coupled data recording systems such as a tape system 38 for magnetically recording acquisition system output a graphical system 40 for providing a hard copy of the output and a cathode ray tube 42 for providing a real time visual image of the data that is acquired by the acquisition system.

The down hole some 12 incorporates within its internal electronic circuitry and acoustic transducer array 44, a preferred embodiment of which is disclosed in FIGS. 3 and 4–6. The transducer array 44 is provided with a plurality array switches 46 which are coupled with array receivers 48 and array transmitters 50 under the control of an array timing circuit 54. The output of the array transmitter 50 are processed by an amplitude/receiver control 54 under the control of a signal processor circuit 56. The output of the array receivers is then processed by analog to digital conversion circuitry 58 thus providing a digitized array receiver output to an array memory circuit 60. The data from the array memory 60 is processed by array processor circuitry 62 and provided to an input buffer 64 and to the signal processor 56. The output of the signal processor is provided to an output buffer 64 permitting controlled data transmission from a data transmitting circuit 66 which furnishes data to the receiver system circuit 32.

The circuitry of FIG. 1 permits each of the multiple acoustic transmitters of the transmitter array 44 to fire one at a time in a controlled sequence for transmission of acoustic signals from the sonde to the bore hole wall and into the formation. The array timing circuit also permits time controlled reception of acoustic reflections from the surrounding formation. The array timing circuit 52 together with the signal processor 56 also provides the down hole sonde with the capability of providing directionally controlled or focused acoustic signals for beam steering and bessel shading of the conformal array.

Referring now to FIG. 2, which is a sectional view illustrating a portion of the sonde 12, as mentioned above the sonde housing 14 defines an internally threaded socket 68 which receives the externally threaded extremity 70 of an elongate connector portion 72 of a housing connector sub 74. The elongate housing connector 72 defines an internal bore 76 which defines a dry through-wire passage for multiple electrical conductors that are individually connected to piezoelectric elements of the array as will be described herein below. The connector projection 72 is sealed with respect to the housing section 78 of the housing 14 by circular seals 80 which are contained within respective seal grooves of the connector projection.

The length of the connector projection cooperates with the housing section 78 so as to define an annular recess or receptacle 82 which is closed by an annular mechanically focused acoustically transparent window 84 having an intermediate focusing section 86 of concave curvature. The focusing window 84 is sealed with respect to the housing sections 78 and 74 by means of circular seals 88 and 90 that are contained within respective annular seal grooves of the housing sections. Though the acoustically transparent window 84 has a curved section for mechanically focusing acoustic signals being emitted from the straight transducers, it should be borne in mind that the transducers themselves may be curved to achieve signal focusing and the window may be of the non-focusing variety. Internally of the annular recess or receptacle 82 is located in annular backing 92 which is surrounded by a plurality of substantially equally spaced piezo-electric elements 94 which may be separate from the backing or may be affixed to the backing as desired. A connector block 96 is located within the recess or receptacle 82 and is provided with a plurality of connector pins 98 which extend through respective passages of the housing section 74 with end portions thereof exposed for connection within a conventional pin receptacle not shown. Each of the connector pins 98 is coupled by an electrical conductor to an individual piezo-electric element 94 and is adapted to conduct firing pulses to the respective piezo-electric element for excitation thereof and for conducting reflected acoustic signals from the piezo-electric elements for processing by the circuitry of FIG. 1 together with acquisition of acoustic data representing the down hole formation environment.

With reference now to FIG. 3 an isometric illustration of a thirty-two element cylindrical array is illustrated which is representative of the piezo-electric array module shown at 92–94 in FIG. 2 is provided with an acoustic attenuating backing section 92 which is preferably composed of a suitable elastomer filled with high-density metal chips, such as tungsten chips. The backing section 92 is selected to preferably provide an acoustic attenuation of about thirty db/cm, and when filled with the high-density tungsten chips, provides an acoustic impedance of about 13.3 Mega-rayls, MKS. This is a desirable impedance match for the multiple piezo-electric transducer elements which may be composed of lead-metaniobate ceramic having an acoustic impedance of 21.7 Mega-rayls, MKS since a 2-to-1 ratio is desirable.

In the preferred embodiment, the array transducer is imbedded in a module of high structural strength, which is acoustically transparent (window) at the array outer transmitting surface, and acoustically attenuating on the array inner surface (backing). The module should withstand pressures of 20 kpsi, and temperature of about 200° C., without significant radial deformation due to the compressional force created by the pressure environment. The acoustic properties of the outer surface should allow sufficient thickness in the window to provide the radial compressional strength, at a thickness of one-quarter of a wave length of the primary component of transmitted frequency. The module should be hermetically sealed and compatible with the stainless and/or titanium components to which it is attached. The outer surface of the module must be resistant to the corrosive environments common to the wireline industry. The thermal expansion coefficient of the module material should be as close as possible to the thermal expansion properties of the transducers. The multiple transducer array, including its acoustically transparent window, may be an integral unit which is retained by the housing structure and sealed relative to the housing by O-rings or other suitable sealing elements. To enable the transducer array to withstand the hydrostatic pressure conditions that will be typical of deep wells the transducer array will be wrapped with a carbon fiber material so that the carbon fibers thereof will add structural resistance to radial compression. The resulting annular transducer array structure can then be simply installed within the housing of a down hole logging sonde by a simple "plug-in" arrangement. This feature will permit the transducer array package to be easily and efficiently changed out even under field conditions in the event such should become appropriate.

A preferred embodiment of the structure of the array mounting material for the module is a carbon composite material, which is designed to be acoustically transparent at the window surface, and "loaded" with tungsten (or other materials), powder and chips on the back of the transducer to provide acoustic damping. The carbon composite material may be metalized with a thin corrosion resistant metal, with sufficient thickness to prevent a loss of hermiticity due to normal scratching and abrasion. The metalization material may be selected to allow for periodic re-metalization.

In an alternate embodiment of the mounting structure described above ceramic materials rather than carbon composite may be utilized.

The piezo-electric transducer elements 94 are fabricated preferentially of lead metaniobate; however for other frequencies of operation other transducer materials shall include but not be limited to lead, zirconate, titanate (all forms), barium titanate lithium sulfate, quartz, lithium niobate and pvdp. The inter-element spacing 96 as shown in FIG. 3 will be filled with acoustically damping materials, e.g. but not limited to, tungsten powder loaded epoxy, tungsten powder loaded carbon composite and tungsten powder loaded ceramics. With backing and inter-element attenuation the acoustic pulses are emitted unidirectionally in the radially outward direction from the array. The supporting structures, attenuation and window systems shall be designed to prevent electrical short circuits between array elements.

The nominal operating frequency range of the piezo-electric array representing the preferred embodiment shall be in the range of from 200 to 500 kHz. Other applications may include frequencies as low as 10 kHz to as high as several MHz.

For well bore image scanning, casing/cement evaluation the preferred embodiment will take the form of a mechanically vertical focused, orthogonally scanning array of 32 to 128 elements, operating at a frequency of about 250 kHz. For well bore image scanning, a high resolution vertical embodiment may be preferred. This array shall be mechanically focused in the horizontal direction, and focused and scanned in the vertical direction. A preferred embodiment would have eight horizontally focused elements on each of the eight faces of an octagonal parallelapiped. This mode allows a high resolution vertical scan.

For behind casing volumetric procedures, the preferred embodiment will typically take the form of a mechanically vertical focused, horizontal scanning conical array of 32 to 128 elements designed to be incident on the bore hole wall at an angle of from about 10° to about 35° and preferably approximately 20°. For fluid volumetric procedures, one preferred embodiment may take the form of biconical dual array embodiments. This biconical dual array will have oppositely directed conical array sections which may be spaced by an intermediate spacer. If desired, the intermediate spacer may conveniently take the form of a cylindrical transducer array of the general character set forth in FIGS. 4-6. The apex of the conical arrays will be pointing toward each other. The preferred array embodiment for this feature is the mechanically vertically focused, orthogonally scanning array. The space between the array elements will be designed to permit reflections from the well bore, casing or pipe to be received on the other array. Interchangeable spacers will be provided to permit use in various diameter well bore, casings and pipe.

Another embodiment of this invention for volumetric scanning may conveniently take the form of a biconical dual array such as is set forth in FIG. 18, with curved or tapered frustoconical ends, except that the array shall be mechanically focused in the horizontal position, and electronically focused and scanned in the vertical direction. It is envisioned that this embodiment would have eight horizontally focused elements on each of the eight faces of an octagonal "cone".

Another embodiment consists of a full scanning array, with electronic focusing and steering in both the horizontal directions. This array of conical variations could be used in all of the above applications.

Additional embodiments include synthetic multiple transmitters and receivers. For example, an octagonal arrangement of orthogonally focused, vertically steered array elements could be designed to fire all elements around the octagon in parallel, creating vertically steered, monopole, dipole, crossed dipole, segmented dipole, quadrapole, crossed quadrapole, octapole acoustic radiation fields, and combination modes. The receiver of the acoustic signals could be the transmitting array in a pulse echo mode, or a second array could be configured to receive the pulse echo signals. Another alternate to the pulse echo system is continuous wave transmission with a second receiver.

Direct formation density measurements using biconical arrays may take the following general forms:

ARRAY ELECTRONICS:

Transmitter:
The array transmitters 50 consist of piezo-electric elements, inductors, tuning inductors, transformers, multiplexers, drive electronics and voltage control electronics.

Array driver:
The array drivers are designed using conventional pulse echo or continuous wave piezo-electric drivers, with at least one driver per active element, and as many as one driver per element. Using conventional multiplexing techniques, the number of drivers can be minimized. The driving pulses shall be shaped to minimize harmonic distortion in the acoustic pulse wave form, and to minimize excitation of undesirable harmonic modes within the transducer element. Typical pulse shaping shall be, but not limited to, half-sine single pulses, to multiple half periods of a sine wave.

The pulse echo signal power may be increased by utilizing multiple fire pulses with a pulse frequency equal to the characteristic frequency of the transducer. The pulses driving the transducer may be unipolar, or bipolar. The output stages of the amplifier may also be push-pull.

Array transformer:
The array drivers are connected to each transducer element through the means of transformers, inductors and tuning inductors.

In a preferred embodiment, an array of transformers, inductors and tuning inductors is fabricated from a single ferrite substrate creating a module containing one transformer, one inductor and one tuning inductor per array element. The array transformer can be partitioned into smaller subgroups, as required by spatial geometry limitations and magnetic element sizes. The preferred embodiment of the array transformers would place the magnetic components in circular ring with an outer diameter equal to the diameter of the array, and an inner diameter approximately equal to the inner diameter of the array. If the size of the magnetic elements were too large for this arrangement, alternate embodiments would allow the rings to be placed on both ends of the array, and optionally multiple rings could be utilized. The inductor and tuning elements are required to optimize the response to the driving signal.

An alternate preferred array transformer would be a rectilinear array approximately two inches by two inches. The actual size will depend on the ferrite selected, the detailed transformer, inductor and tuning inductor design.

Tuning:

The array shall be electrically tuned by the combination of the inductances in the coupling transformer, a fixed inductor and a tuning inductor. The array transformers, inductor and tuning elements shall be designed to allow the array and the transformers, fixed inductor and tuning inductor to be removed as a unit, allowing replacement of a transducer without retuning.

Transmit amplitude control:

The fire voltage for each element may be variable and controlled by the electronics. The fire voltage shall be controlled by conventional voltage control electronics.

Element shading:

Electronic shading shall be provided by making each array element drive voltage variable, allowing for side lobe suppression utilizing one of the following (but not limited to) Bessel shading, Cosine shading or Gaussian shading. The shading is accomplished by adjusting the fire voltage on each element of the array by reducing the drive voltage (relative to the center element, if the number of active elements is odd, or the center pair if the number of elements is even) to each element according the function described by the selected shading technique and the distance of the element from the central peak. The shading in the case of Bessel or Cosine shading may include shading from the central peak to the first zero, or out to multiple zeros and peaks.

Transmit timing control: Electronic focusing and steering shall be provided by conventional array timing technology.

Receiver:

The array transmitters consist of piezo-electric elements, inductors, tuning inductors, transformers, multiplexers, and electronic amplifiers and gain control electronics and analog to digital converters.

Array receiver:

The array receivers are designed using conventional pulse echo or continuous wave piezo-electric receivers, with at least one receiver per active element, and as many as one receiver per element. Using conventional multiplexing techniques, the number of drivers can be minimized. Filtering shall be accomplished using conventional active electronic filters.

Receiver gain control:

The gain shall be selectable using conventional variable gain electronics.

Element shading:

Receiver element gains may be adjusted using variable gain techniques using conventional electronics. The shading shall use Bessel, Cosine or Gaussian shading as described above in connection with the transmitter section.

Receiver timing control:

Electronic focusing and steering shall be provided by conventional array timing technology.

Dynamic transducer damping:

Dynamic transducer damping shall be accomplished by providing a feedback drive system to cancel the harmonic motion of the transducer, by driving the transducer to cancel motion generated by the oscillation of the transducer. The feedback signal output may also be used as a receiver pick off signal. The feedback signal shall maintain a zero voltage on the transducer electrodes at all times, except for the fire pulse. The electronics shall be designed to prevent over voltage conditions on the receiver section of the array electronics, and to allow maximum application of drive voltage power. In the case of multiple pulse transducer firing sequences the following will be utilized in conjunction with the feedback technique above: Following the activation pulse strings, a contiguous pulse string of equal length of less, 180° out of phase with the activation pulse string will drive the transducer. The optimum number of out of phase signals to provide active damping will be determined for the array following fabrication. The objective of the active damping is to reduce the transducer ringing voltage into the control range of the active feedback electronics described above.

Array processors:

The array electronics shall contain a number of conventional design dedicated signal processor to process high data rate array data real time.

Signal reconstruction:

A unique real time signal processing algorithm may be employed in the array electronics. This technique requires firing each element individually, and receiving the pulse echo from the signal simultaneously on the selected active array elements. The receiver signal is reconstructed mathematically in the array processors by applying the appropriate timing shifts and gain adjustments. In this technique, for example, a 64 vertical element array would have each element fired once to produce 64 transmit data sets per revolution. Each data set would contain the results of the analog to digital conversion of the pulse echo signal received on each receiver element. For example, if eight receiver elements were active, there would be eight digitized pulse echo wave forms for each of the 64 receivers in the array, or 512 data sets per revolution. The signal is reconstructed in the following method. Each pulse echo signature is digitally phase shifted to the appropriate timing as computed for focusing and steering and fluid velocity travel time compensation, a gain term is generated for each pulse echo signature as computed by the shading technique and fluid attenuation compensation. Each data point in the signature is multiplied by its appropriate gain (or attenuation) factor. The array signature is then built by adding the phase and gain adjusted signatures from each elemental combination of firing and receiving elements. The number of signatures which are available for this reconstruction is N squared, where N is the number of active elements for the phased array. This should result in a signal improvement of up $20* \log(N^2)$ dB, for N equal to 8 this is 36 dB and a signal to noise improvement of $20* \log(N^2)$ db, for N equal to 8 this is 18 dB. The table below illustrates for eight active elements, the transmitter receiver combinations which can be used to reconstruct the wave form. Each $X_{ij}$ is an array of M samples of signature data. The number of samples in the signature will depend on the characteristic frequency and sample rates of the analog to digital converters as indicated by the following example:

|    | T1  | T2  | T3  | T4  | T5  | T6  | T7  | T8  |
|----|-----|-----|-----|-----|-----|-----|-----|-----|
| R1 | X11 | X12 | X13 | X14 | X15 | X16 | X17 | X18 |
| R2 | X21 | X22 | X23 | X24 | X25 | X26 | X27 | X28 |
| R3 | X31 | X32 | X33 | X34 | X35 | X36 | X37 | X38 |
| R4 | X41 | X42 | X43 | X44 | X45 | X46 | X47 | X48 |
| R5 | X51 | X52 | X53 | X54 | X55 | X56 | X57 | X58 |
| R6 | X61 | X62 | X63 | X64 | X65 | X66 | X67 | X68 |
| R7 | X71 | X72 | X73 | X74 | X75 | X76 | X77 | X78 |
| R8 | X81 | X82 | X83 | X84 | X85 | X86 | X87 | X88 |

A weighting array may be developed to compensate for shading and signal attenuation due the different path lengths of each of the signals as indicated by the following:

|    | T1  | T2  | T3  | T4  | T5  | T6  | T7  | T8  |
|----|-----|-----|-----|-----|-----|-----|-----|-----|
| R1 | W11 | W12 | W13 | W14 | W15 | W16 | W17 | W18 |
| R2 | W21 | W22 | W23 | W24 | W25 | W26 | W27 | W28 |
| R3 | W31 | W32 | W33 | W34 | W35 | W36 | W37 | W38 |
| R4 | W41 | W42 | W43 | W44 | W45 | W46 | W47 | W48 |
| R5 | W51 | W52 | W53 | W54 | W55 | W56 | W57 | W58 |
| R6 | W61 | W62 | W63 | W64 | W65 | W66 | W67 | W68 |
| R7 | W71 | W72 | W73 | W74 | W75 | W76 | W77 | W78 |
| R8 | W81 | W82 | W83 | W84 | W85 | W86 | W87 | W88 |

The weighting array is multiplied on a signature by signature basis yielding the following product array:

|    | T1     | T2     | T3     | T4     | T5     | T6     | T7     | T8     |
|----|--------|--------|--------|--------|--------|--------|--------|--------|
| R1 | W11X11 | W12X12 | W13X13 | W14X14 | W15X15 | W16X16 | W17X17 | W18X18 |
| R2 | W21X21 | W22X22 | W23X23 | W24X24 | W25X25 | W26X26 | W27X27 | W28X28 |
| R3 | W31X31 | W32X32 | W33X33 | W34X34 | W35X35 | W36X36 | W37X37 | W38X38 |
| R4 | W41X41 | W42X42 | W43X43 | W44X44 | W45X45 | W46X46 | W47X47 | W48X48 |
| R5 | W51X51 | W52X52 | W53X53 | W54X54 | W55X55 | W56X56 | W57X57 | W58X58 |
| R6 | W61X61 | W62X62 | W63X63 | W64X64 | W65X65 | W66X66 | W67X67 | W68X68 |
| R7 | W71X71 | W72X72 | W73X73 | W74X74 | W75X75 | W76X76 | W77X77 | W78X78 |
| R8 | W81X81 | W82X82 | W83X83 | W84X84 | W85X85 | W86X86 | W87X87 | W88X88 |

Each of the weighting factors is a combination of the desired shading for each transmitter/receiver pair, the variations is signal strength due to the different path lengths and resulting attenuation in the propagation media and certain geometric considerations. One of the geometric considerations is the "direct" reflection path from the transducer to itself. For elements which are near the center of the array, the direct reflection path may be desired, while for elements removed from the array center, the direct reflection path may produce undesirable and unwanted direct reflections. Similarly, adjacent elements near the center may have desirable reflection paths, while those pairs removed a distance from the center may produce undesirable reflection paths. In general, from geometric considerations, elements along the diagonal (Wii) have desirable reflection paths unless they are near the center of the array, while those elements on the anti-diagonal (Wi,9-i) all have desirable reflection paths. Elements near the anti-diagonal are more desirable than those which are further away. If the distance from geometric target center for each direct reflection point for each array pair to the desired focal point of the array is calculated, the computed distance can be used to compute the geometric weighting for each transmitter receiver pair. For example, if the focused beam energy profile normal to the beam, at the target point followed Gaussian profile, where the peak of the Gaussian is at the focal point, then a Gaussian weight distribution could be applied to the weighting array to reduce undesired direct reflections from each element. For example, the following geometric weighting could be used:

|    | T1 | T2 | T3 | T4 | T5 | T6 | T7 | T8 |
|----|----|----|----|----|----|----|----|----|
| R1 | 0  | .1 | .2 | .4 | .6 | .8 | .9 | 1  |
| R2 | .1 | .2 | .4 | .6 | .8 | .9 | 1  | .8 |
| R3 | .2 | .4 | .6 | .8 | .9 | 1  | .9 | .8 |
| R4 | .4 | .6 | .8 | .9 | 1  | .9 | .8 | .6 |
| R5 | .6 | .8 | .9 | 1  | .9 | .8 | .6 | .4 |
| R6 | .8 | .9 | 1  | .9 | .8 | .4 | .2 | .2 |
| R7 | .9 | 1  | .9 | .8 | .6 | .4 | .2 | .1 |
| R8 | 1  | .9 | .8 | .6 | .4 | .2 | .1 | 0  |

The approach is to reduce the amplitude of reflected signals outside of the desired focal spot size be decreasing the weighting of those reflections. The weighting may be Gaussian, but is not limited to Gaussian weight distributions.

Dynamic transmitter characteristic signature compensation, pulse echo mode:

Because the characteristic signature of an acoustic transmitter is very repeatable, even though it may be complicated, dynamic transducer characteristic signature compensation is realizable, even in the presence of various signals. Since the contribution of pulse echo in any real measurement system is time variant in amplitude and phase, the average over a sufficient number of pulse echo signals will produce a zero mean, low variance data set. In order to compensate for transmitter activated acoustic signals, which are not return echo, the signature for each transmitter must be determined. Each signature or waveform is computed from a set of N single transducer element firings that are simultaneously received on N separate transducer circuits. For example, when each of the 64 transducers of an acoustic transducer array is fired, 8 of the transducers will be in a receiving mode so that multiple signals are received upon each transducer firing. These multiple signals are then processed electronically according to this invention. The signature for a given array firing position is determined by the superposition of these $N^2$ single element signatures, where each signature is delayed by the appropriate delay for $$O_i = \sum_{j=1}^{N} \sum_{k=1}^{N} x_{(i+\delta_{j,k}),j,k} * w_{j,k} * g_{j,k}$$

focusing and steering so that the output wave form is described by:

where $\delta_{j,k}$ is the delay (quantized to sample rate of the wave form)

$W_{w j,k}$ is the shading weights $\delta_{i,j}$ is the geometric shading and $$O_i = \sum_{j=1}^{N} \sum_{k=1}^{N} x_{(i+\delta_{j,k}),j,k} * W_{j,k}$$

$$W_{j,k} = w_{j,k} * g_{j,k}$$

The signature can be compensated according to:

$$O_i = \sum_{j=1}^{N} \sum_{k=1}^{N} \{x_{(i+\delta_{j,k}),j,k} - S_{i,j,k}\} * W_{j,k} * g_{j,k}$$

where $S_{j,k}$ is the element by element average of the digitized single element signature.

If a transmitter amplitude profile, including any pulse echo returns are digitized, stored and averaged point by point, with a sufficient averaging time or filtered using a low frequency low pass filter, then the remaining signal will be a good approximation the transducer voltage which would be measured in the absence of pulse echo. For any transducer in the array which is being activated as both a transmitter and receiver, (or any transducer in general), the averaged signature of the transmitter can be subtracted from the received waveform on a point by point basis, resulting in a "pure" pulse echo response. The same compensation technique can be used to eliminate signature cross talk between transmitting elements and its neighboring elements.

Signal Processor:

The signal processor shall be a conventional signal processor utilizing standard signal processor design techniques.

Array compensation and calibration:

The array instrument shall have a dedicated transducer to measure the fluid slowness and attenuation. The tool shall be designed to be continuously self calibrating. This shall be achieved by inserting into the acoustic pathway, a propagation medium with calibrated acoustic properties and geometry. The "calibration" shall be calibrated over temperature and pressure variations to allow for polynomial models for improved calibration. The results of these measurements shall be used to compensate the array timing and amplitudes.

Amplitude control:

The signal processor shall compute the coefficients of the weighting matrix, and send the coefficients to the array processors. The signal processor shall adjust the amplitude control matrices for changes in fluid attenuation, and path length variations if the steering timing indicates changes in path length.

Timing control:

The signal processor shall also determine the centering and eccentricity of the bore hole. The results of the centering and eccentricity shall be used to compensate for variations in signal amplitude due to eccentricity and centering, and may be used to modify the selected array elements to be utilized to generate the well bore scan. For example, if the tool is off center, and the target point is not "in front" of the normal array center, the array center could be offset one or more elements to minimized the undesirable effects of surface angles.

Array focusing:

The focal point of the array may be dynamically adjusted by signal processor based on the eccentricity and off center calculations. The signal processor will produce a modified timing arrays to be sent to the signal processors, to allow for the variations in distance to the target points.

Array bore hole fluid compensation:

Attenuation (self Calibrating):

A dedicated transducer shall be used in pulse echo mode. Conventional pulse echo signal generation and receiver gain and digitization shall be utilized. An additional material of known calibrated acoustic properties, attenuation, thickness and acoustic impedance may be added to the acoustic path between the transducer and a reflective surface exposed to the well bore fluid. By measuring the amplitudes of the return signals from the face of the calibration unit, and the reflective surface through the well bore fluid and the distance traveled in the calibrator and the well bore fluid, the fluid attenuation can be calculated. The calibration can be performed in software in the signal processor and used to compensate the signal amplitudes for each element in the array transducer.

Travel Time (Self Calibrating):

The same transducer and electronics described above can be used in pulse echo mode to measure the fluid velocity. The calibrator block of known thickness and acoustic velocity can be used as a reference for the time of flight measurements in the well bore fluids. The travel time to each surface in the transducer unit shall be measured, the distance across the calibration unit and the gap which is exposed to the well bore fluids shall be measured. The distances traveled in each medium, and the travel time shall be utilized to provide a calibrated mud velocity. The fluid slowness shall be calculated in the signal processor and applied to compensate timing of the array transducers.

With reference now to FIGS. 4 through 7, a method of manufacturing a generally cylindrical transducer array similar to that of FIG. 3 is disclosed and the basic structure of the transducer array is also disclosed. A backing element 98 of generally cylindrical configuration is provided which is composed of any of the backing materials described above. Preferably, the backing material of backing element 98 will comprise an elastomer filled with high density metal chips or high density tungsten chips thus providing it with the capability for acoustic attenuation and acoustic matching. About the backing element 98 is provided a generally cylindrical body 100 composed of a suitable piezo-electric transducer material, such as lead-metaniobate ceramic zirconate titanate, barium titanate, lithium sulfate, quartz, lithium niobate and pvdp. The cylinders 98 and 100 may be adhered together at cylindrical interface 102 by any suitable bonding agent, adhesive or by any other means to maintain them in assembly. Alternatively, the backing material 98 may be introduced within the cylinder 100 in an uncured liquid state and permitted to cure in place. This process will be described in detail hereinbelow. To the respective ends 104 and 106 of the cylindrical assembly comprising the cylinders 98 and 100 are attached end caps 108 and 110 each having a peripheral groove 112 within which the respective end of the cylindrical assembly is received. The upper and lower end caps 108 and 110 may also be attached to the cylindrical assembly with any suitable bonding agent or by means of any suitable adhesive material. An inner connector or signal return connector 91 is seated within the upper extremity of the array cylinder 100 and with its lower surface 93 in substantial engagement with or in close proximity to the upper end of the body of backing material 98. The outer cylindrical surface 95 of the inner connector will be received within the upper end of the array cylinder and will be soldered or conductively bonded to the inner surface of the array cylinder. The inner or signal return connector is preferably composed of a metal such as copper which is coated to withstand corrosion and provides a single electrical connector 97 located centrally thereof. An outer connector or signal connector 99 having a multiplicity of spaced connector pins 101 projecting therefrom is positioned at the upper end of the array cylinder and is covered by and perhaps retained in position by the upper end cap 108. The outer signal connector is composed of a conductive material such as copper and is soldered or conductively bonded to the outer surface of the array cylinder. The connector pins 101 project through registering openings 103 in the planar wall 105 of the upper end cap for contact with other electronic components. An array transformer block 107 may be attached to the upper end cap after the cutting operation has been completed so that the connector pins 101 establish electrical contact with respective ones of multiple transformers within the transformer block. The array transformer block is designed to be attached to the piezo-electric array and electrically connected to the individual array elements and to driver and receiver electronics either as a single unit or as multiple units. The transformer block 107 may define multiple electronics connectors 109 for contact with the respective connector pins 101 of the outer connector. As an alternative, the connector pins 101 may be receptacles and the connectors 103 of the transformer block may take the form of connector pins. The inner connector pin 97 will be exposed at the central opening 111 of the transformer block.

When it included to employ an uncured backing material, the array components, including the array cylinder, inner and outer connectors and end caps will be assembled, with an internal partitioning tube being located within the cylinder and with its internal opening in registry with the central openings 113 and 115 of the end caps. The uncured backing material, in a liquid or semi liquid state, is then forced through an end cap opening such as shown at 117 and 119 and into the annulus between the inner wall of the array cylinder and the outer surface of the internal tube. Openings 87 and 89 are defined respectively in the outer connector 105 and inner connector 91 to permit the uncured backing material to flow from the end cap opening into the annulus. When the annulus is full of backing material any excess will exit at the opposite end cap opening 117 and 119. After the backing material has cured to form a solid mass the internal tube may be allowed to remain in assembly with the array or it may be removed.

After the cylindrical assembly of FIG. 4 has been completed, and before the transformer block has been installed, a plurality of length wise parallel cuts are made in the assembly as shown in FIGS. 5 and 6. These cuts extend completely through the outer transducer layer 100 and the inner conductor ring 99 and slightly into the backing layer 98. This separates the annular transducer body into multiple electrically isolated transducer and connector assemblies while the inner conductor remains continuous so that each return conductor of the respective transducers will be shorted or electrically connected to the single return connector pin. One suitable means for accomplishing these cuts is by angularly oriented saw cuts about the cylindrical axis 116. These saw cuts can be made by mounting the cylindrical transducer assembly in a chuck for rotation about the axis 116 and by dividing its periphery so that the saw cuts will achieve a desired number of transducer elements of equal width. After the cuts have been made each transducer and its respective electrical connection will be electronically isolated for individual electronic excitation. If transducer elements of unequal width are desired then the saw cuts may be appropriately made so that the dimensions thereof are unequal as shown in FIG. 7. It should be noted with respect to FIG. 7 that the peripheral cuts 118 of quarter sections 120 and 122 are more closely spaced as compared with cuts 124 of quarter segments 126 and 128. This particular cut spacing however is not intended to be limiting of this invention because unequal spacing of any desirable nature may be employed so that rectilinear piezo-electric elements of unequal width may be utilized in an acoustic array.

As mentioned above, for purposes of well logging it is considered desirable to achieve focusing of acoustic signals at desired points relative to the formation surrounding the bore hole. Focusing can be mechanically accomplished both vertically and horizontally by controlling the configuration of the piezo-electric elements of the array. As shown in FIGS. 8 and 9, a piezo-electric array is shown generally at 130 by way of isometric illustration and employs a central acoustic attenuating backing member 132 of annular configuration which is surrounded by a plurality of equally spaced curved piezo-electric elements 134. As is evident from the sectional view of FIG. 9 the backing element 132 defines a generally cylindrical through bore 136 which enables the array unit 130 to be mounted about a cylindrical support, such as the connector projection 72 of FIG. 2. The backing element 132 further defines an external concave surface 138 to which is bonded or otherwise secured the curved inner surfaces 140 of the curved rectilinear piezo-electric elements 134. These piezo-electric elements are of approximately constant width along the vertical length thereof and thus define external acoustic signal focusing surfaces 142 for mechanically focusing the acoustic signals at the bore hole wall or at any other suitable location relative to the transducer array. When acoustic signal focusing is achieved there is longer range, deeper penetration of the acoustic signals into the formation and therefore better depth of penetration of the signals into the formation so that better angular resolution is achieved. Electronic focusing in the horizontal direction is utilized for the purpose of steering.

With reference now to FIGS. 10–12 and alternative embodiment of this invention is disclosed generally at 144 which is provided for vertical mechanical focusing of the acoustic signals. The array assembly 144 incorporates an external acoustic window 146 having upper and lower cylindrical end segments 148 and 150 between which is located an external peripheral acoustic focusing surface 152 which is of concave configuration. The acoustic window thereby achieves focusing of acoustic signals being transmitted from an internal acoustic piezo-electric array. The piezo-electric array is defined by a generally cylindrical backing 154 defining a cylindrical through bore 156 for mounting of the array assembly within the sonde. The backing element 154 which may comprise any suitable acoustic signal attenuating material also defines an external cylindrical surface 158 to which a plurality of spaced rectilinear elements 160 are affixed by means of bonding or by means of any suitable adhesive. The piezo-electric elements 160 define external surface segments 162.

Referring now to FIG. 13, there is shown a generally cylindrical piezo-electric array generally at 164 by way of isometric illustration which incorporates an internal generally cylindrical backing element 166 having an internal through bore 168. Externally of the signal attenuating backing is provided a set of piezo-electric acoustic elements comprising a set of N×M equal length and width rectilinear piezo-electric elements aligned along the cylindrical axis of the array where N is the number of elements around the array and M is the number of piezo-electric elements along the cylindrical axis of the array. In this particular case N represents 64 piezo-electric elements disposed around the array and M represents 8 piezo-electric elements in each vertical row along the array axis. It should be born in mind that these are arbitrary numbers with both N and M representing any desired numbers for intended results. It should be born in mind however that each of the individual piezoelectric elements is electrically coupled to a single electrical conductor so that it may be individually excited by an electric voltage pulse for signal generation. Also it should be born in mind that the piezo-electric elements may be coupled in selected groups with individual electric conductors so that they may be fired simultaneously if desired for a particular character of signal generation.

FIGS. 14–17 are graphically representative of horizontally focusing piezo-electric arrays. In FIG. 14 the array shown generally at 172 is of curved external configuration defining a concave external array surface 174 and having an upper end extremity 176 of greater diameter than its lower extremity 178. The array 72 may be employed individually or in combination with other array sections to provide for desired horizontal focusing of acoustic signals being emitted by individual piezo-electric elements 180.

As shown in FIG. 16, generally at 182, this invention contemplates the provision of a piezo-electric array of generally frusto-conical configuration having a plurality of individual piezo-electric acoustic transmitter elements 184 which collectively define an external conical array surface 186. In the case of FIG. 15 the larger diameter extremity 188 of the array defines the upper end while the smaller extremity 190 defines the lower end of the array.

As shown in FIG. 16, a piezo-electric acoustic array is illustrated generally at 192 having a large upper extremity 194 and a smaller lower extremity 196. This array is defined by plurality of individual piezo-electric elements 198 which extend from top to bottom of the array and which are arranged in side-by-side spaced relation. Each of the piezo-electric elements is of curved configuration so that the transducers collectively define an externally curved concave surface 200 of the array.

As shown in FIG. 17, a piezo-electric acoustic array is shown generally at 202 and is of generally frusto-conical configuration having a large upper end 204 and a smaller lower end 206 and which is defined by a plurality of elongate piezo-electric elements 210 having external surfaces which collectively define an external array surface 212 of conical configuration. The individual piezo-electric elements 210 are arranged in side-by-side spaced relation with the vertical height thereof defining the height of the array.

With reference to FIG. 18, a tapered or curved generally biconical array is shown generally at 212 and is shown in relation to a well bore wall 214. The biconical array incorporates upper and lower array sections shown generally at A and B each being of the configuration shown in FIG. 16 and each incorporating a plurality of elongate side-by-side spaced, curved piezo-electric elements similar to that discussed above in connection with FIG. 16. The array elements A and B are spaced by an intermediate section which is designated for differential fluid flow. Element A may function as a transmitter with each of the piezo-electric elements 218 being appropriately excited by electric pulses. The biconical extremity B may function as a receiver with each of its piezo-electric elements 220 electrically coupled in the receiving mode. The transmitted acoustic signals are mechanically vertically focused by virtue of the configuration of the piezo-electric elements as shown by way of dotted lines. By then adding the acoustic signals of the arrays A plus B the average speed of fluid flow may be determined while by subtracting the acoustic signals A minus B the differential speed of the fluid flow can be established. The piezo-electric elements may be fired element by element or they may be fired simultaneously as need be for appropriate signal transmitting and receiving. The length of the central spacer 216 may be adjusted to accommodate the use of a particular size array in various diameter well bore, casings and pipe.

Another embodiment that is suitable for volumetric scanning is a biconical dual array such as shown in FIG. 18 except that the array is mechanically focused in the horizontal position and electronically focused and scanned in the vertical direction. It is envisioned that such an array would have 8 horizontally focused elements on each of the 8 faces of an octagonal "cone".

With reference to FIGS. 19 and 20 a piezo-electric transducer array is shown generally at 222 which is an unfocused array of octagonal configuration having multiple piezo-electric elements defining substantially planar external surface faces 224. The array configuration of FIGS. 19 and 20 could best be employed for vertical beam steering. An octagonal focused array embodiment is shown generally at 226 in FIGS. 21 and 22 with each of the 8 faces of the octagonal configuration being defined by horizontally curved surfaces such as shown at 228. These curved surfaces achieve a vertical scan for high resolution dip measurement of a surrounding earth formation.

As mentioned in connection with FIG. 4 a transformer block 107 may be employed to alter the voltage being supplied to the individual piezo-electric transducers. As shown in FIGS. 23 and 24 the transducer block may take a form as shown generally at 230 including a body 232 of ferrite material which defines circular depressions 234 about integral posts 236 thus causing the ferrite posts to represent transformer cores. The depressions receive transformer winding conductors having a desired number of turns and representing the input and output windings of the transformer. The winding conductors are secured within the respective depression by a potting material such as a suitable polymer. A closure 238, also composed of ferrite or any other suitable material, is bonded or otherwise fixed to the surface 240 so as to simultaneously form a closure for all of the transformer depressions. The electrical input and output leads of the transformer windings will be exposed for electrical connection to an input source and to the transducer connector elements or pins.

Each of the transformers can be tuned by a simple transformer tuning device as shown in FIG. 25. The central pole or core 236 may be tapered on one side as shown at 242. A ferrite tuning element 244 having an adjustment slot 246 and also having a core adjusting post 248 is rotatably secured. The ferrite post 248 is tapered at its end 250 so that when rotated relative to the core post 236 the structure of the transformer core is modified for the purpose of tuning the transformer output signal. A transformer array of the general character shown in FIG. 23 is manufactured and sold by Ceramic Magnetics, Inc. of Fairfield, N.J.

As shown in FIG. 26 a ferrite array transformer block of generally circular configuration is shown generally at 254, having multiple transformers 252. It may include transformers that may be tuned or fixed transformers as desired. It may also incorporate a combination of tuned or fixed transformers as needed for proper operation of the transformer block in conjunction with the acoustic transducer array of the invention. Typically the transformer block will have the same number of transformers as the acoustic array has transducers, with the output leads of individual transformers being electrically connected to individual transducer elements It is therefore seen that this invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and combinations. This is contemplated by and is within the scope of this invention.

As many possible embodiments may be made of this invention without departing from the spirit and scope of thereof, it is to be understood that all matters hereinabove set forth or shown in the accompanying drawings are to be interpreted as illustrative and not in any limiting sense.

What is claimed is:

1. An acoustic sonde for down hole well logging operations, comprising:
   (a) housing means defining an internal chamber and having an acoustically transparent housing section;
   (b) an annular acoustic transmitter array located within said housing means adjacent said acoustically transparent section and comprising:
      (1) an annular backing element composed of acoustically attenuating material;
      (2) a plurality of acoustic transducer elements each being located externally of said annular backing element;
      (3) a plurality of electronic transducer circuits;
      (4) a generally circular ferrite array transformer block having a plurality of transformers mounted therein, each being individually electrically interconnected between said electronic transducer circuits and said individual transducer elements for electronic excitation thereof, the transformer block further including means for inductively tuning at least some of said transformers; and
   (c) electronic transmitting/receiving circuitry being coupled in controlling relation with said plurality of electronic transducer circuits.

2. The acoustic sonde of claim 1, further comprising:
a body of high structural strength, acoustically transparent material having said plurality of spaced acoustic transducer elements embedded therein.

3. The acoustic sonde of claim 1, further comprising:
transducer body means securing said plurality of acoustic transducer elements in spaced relation with one another, said transducer body means having a substantially equal coefficient of expansion as compared with the coefficient of expansion of said acoustic transducer elements.

4. The acoustic sonde of claim 1, further comprising:
   (a) said transducer array having an array mounting defining a window surface and being composed of a material that is acoustically transparent at said window surface;
   (b) said plurality of acoustic transducer elements being supported by said array mounting and being oriented to project acoustic waves through said window surface.

5. The acoustic sonde of claim 4, wherein:
said array mounting is composed of carbon composite material and arranged to resist the radially compressive forces of hydrostatic pressure.

6. The acoustic sonde of claim 1, wherein:
said plurality of acoustic transducer elements define a vertically focused horizontal scanning array arranged for incidence on the wall of said bore hole at a predetermined angle.

7. The acoustic sonde of claim 6, wherein:
said predetermined angle is in the range from about 10° to about 35° and preferably about 20°.

8. The acoustic sonde of claim 6, wherein:
said vertically focused horizontal scanning array is of generally conical configuration.

9. The acoustic sonde of claim 1, wherein:
   (a) said annular acoustic transducer array defines an array height; and
   (b) each of said plurality of acoustic transducer elements being of generally rectilinear configuration and having a length substantially equal to said array height.

10. The acoustic sonde of claim 1, wherein said acoustic transducer array comprises:
a plurality of equal width generally rectilinear acoustic transducer elements arranged in equally spaced relation and collectively defining a generally cylindrical transducer array.

11. The acoustic sonde of claim 1, wherein said transducer array is of generally cylindrical configuration having an array height and having a cylindrical axis and further comprising:
a set of acoustic transducer elements having a plurality of rectilinear acoustic transducer elements each having equal width and being of array height and being oriented in equally spaced relation about said cylindrical axis.

12. The acoustic sonde of claim 11, wherein said transducer array further comprises:
a plurality of axially spaced sets of said generally rectilinear transducer elements with each of said axially spaced sets having a plurality of said acoustic transducer elements.

13. The acoustic sonde of claim 1, wherein said transducer array comprises:
a set of "N" equal width rectilinear acoustic transducer elements aligned along the cylindrical axis of the array and having a length equal to array height, where "N" is an arbitrary number of acoustic transducer elements.

14. The acoustic sonde of claim 1, wherein said acoustic transducer array comprises:
   (a) a cylindrical axis being defined by said transducer array; and
   (b) a set of "N" times "M" equal length and equal width generally rectilinear acoustic transducer elements aligned along the cylindrical axis of the array, where "N" is the number of transducer elements around the array and "M" is the number of transducer elements along the cylindrical axis of the array.

15. The acoustic sonde of claim 1, wherein said acoustic transducer array comprises:
   (a) an axis being defined by said transducer array; and
   (b) a set of "N" equal width curved acoustic transducer elements having a geometric radius "R" being parallel to said axis of said transducer array and creating a predetermined focal distance "F", said curved acoustic transducer elements being aligned along said axis and each having a length equal to the height of said transducer array.

16. The acoustic sonde of claim 1, wherein said acoustic transducer array defines a cylindrical axis and further comprises:
A set of "N" times "M" unequal size rectilinear acoustic transducer elements aligned along the cylindrical axis of the array, where "N" is the number of elements around the array, and "M" is the number of elements along the cylindrical axis of the array.

17. The acoustic sonde of claim 1, wherein said acoustic transducer array defines a cylindrical axis and further comprises:

a set of "N" times "M" unequal length and width curved acoustic transducer elements having a geometric radius "R" parallel to the axis of the array creating a focal distance "F", said curved acoustic transducer elements being aligned along the cylindrical axis of the array and having a length equal to array height.

18. The acoustic sonde of claim 1, wherein said acoustic transducer array defines a cylindrical axis and further comprises:

a set of "N" times "M" unequal length and width curved acoustic transducer elements having a geometric radius "R" parallel to the axis of the array defining a focal distance "F", said curved acoustic transducer elements being aligned along the cylindrical axis of the array and being mounted such that their surface lies on the geometric surface of radius "R", said curved acoustic transducer elements further having a collective length defining array height.

19. The acoustic sonde of claim 1, wherein said acoustic transducer array defines a cylindrical array axis and further comprises:

a set of "N" times "M" rectilinear acoustic transducer elements arranged such that the long dimension of each acoustic transducer element is oriented perpendicular to the array axis and where "N" is the number of acoustic transducer elements arranged around the array axis and "M" is the number of acoustic transducer elements along the array axis.

20. The acoustic sonde of claim 1, wherein said acoustic transducer array defines a cylindrical array axis and further comprises:

a set of "N" times "M" curved unequal length and width acoustic transducer elements arranged such that the long dimension thereof is oriented perpendicular to said array axis where "N" is the number of acoustic transducer elements arranged around the array axis and "M" is the number of acoustic transducer elements along the array axis and wherein the curvature of said acoustic transducer elements defines a physical focusing in the direction perpendicular to the array axis.

21. The acoustic sonde of claim 1, wherein said acoustic transducer array defines an array axis and a frustum of a cone described by a surface of revolution about the array axis described by a circle of a radius and where the radius is not perpendicular to the array axis.

22. The acoustic sonde of claim 21, wherein said acoustic transducer array comprises:

a set of "N" equal width rectilinear acoustic transducer elements oriented in aligned relation with said frustum of a cone and being aligned along said array axis and having a length defining the height of said array and where "N" is an arbitrary number of said acoustic transducer elements.

23. The acoustic sonde of claim 21, wherein said acoustic transducer array comprises:

a set of "N" times "M" equal length and width rectilinear acoustic transducer elements being oriented in aligned relation with said frustum of a cone and being aligned along the cylindrical axis of the array, where "N" is the number of acoustic transducer elements around the array and "M" is the number of acoustic transducer elements along the axis of said array.

24. The acoustic sonde of claim 21, wherein said acoustic transducer array comprises:

a set of "N" equal width curved acoustic transducer elements being oriented along the surface of said frustum of a cone and having a geometric radius "R" being parallel to the axis of the array and establishing a focal distance "F", said curved acoustic transducer elements being aligned along the axis of the array and having a length defining the height of said array.

25. The acoustic sonde of claim 21, wherein said acoustic transducer array comprises:

a set of "N" times "M" unequal size rectilinear acoustic transducer elements being oriented along the surface of said frustum of a cone and being aligned along the axis of the array and where "N" is the number of acoustic transducer elements around the array and "M" is the number of acoustic transducer elements located along the axis of the array.

26. The acoustic sonde of claim 21, wherein said acoustic transducer array comprises:

a set of "N" times "M" unequal length and width curved acoustic transducer elements having a geometric radius "R" being oriented in parallel relation with the axis of the array and establishing a focal length "F", said curved transducer elements being oriented along the surface of said frustum of a cone and further being aligned along the axis of the array, said curved transducer elements having a length defining the height of the array.

27. The acoustic sonde of claim 26, wherein:

said curved acoustic transducer elements are of trapezoidal configuration having widths that increase along the conic surface thus maintaining substantially equal spacing of said curved acoustic transducer elements along the lengths thereof.

28. The acoustic sonde of claim 21, wherein said acoustic transducer array comprises:

a set of "N" times "M" rectilinear acoustic transducer elements being oriented along the surface of said cone and being arranged such that the long dimension of each acoustic transducer element is located perpendicular to the array axis and where "N" is the number of acoustic transducer elements arranged around the array axis and "M" is the number of acoustic transducer elements located along the array axis.

29. The acoustic sonde of claim 21, wherein said acoustic transducer array comprises:

a set of "N" times "M" curved acoustic transducer elements having unequal length and width and being oriented along the surface of said cone and being arranged such that the long dimension thereof is located perpendicular to the array axis and where "N" is the number of acoustic transducer elements arranged around the array axis and "M" is the number of acoustic transducer elements located along the array axis, said curved acoustic transducer elements defining a physical focusing in the direction perpendicular to the array axis.

30. The acoustic some of claim 1, wherein said acoustic transducer array defines a generally cylindrical external configuration.

31. The acoustic some of claim 1, wherein said acoustic transducer array defines a generally frusto-conical external configuration.

32. The acoustic sonde of claim 1, wherein said acoustic transducer array defines a curved, concave external configuration having upper and lower ends having a selected diameter and an intermediate portion having a diameter less than said selected diameter.

33. The acoustic sonde of claim 1, wherein said acoustic transducer array defines a biconical external configuration having upper and lower array sections of generally frusto-conical configuration and arranged with the apexes thereof oriented toward one another.

34. The acoustic sonde of claim 1, wherein said acoustic transducer array defines a biconical external configuration having upper and lower array sections of generally frusto-conical configuration and arranged with the large dimensions thereof oriented toward one another and with the apexes thereof defining respective upper and lower ends of said acoustic transducer array.

35. The acoustic sonde of claim 1, wherein said acoustic transducer array defines upper and lower array sections each having a tapered, curved external configuration and defining ends of respective large and small dimension and being arranged with the small dimensions thereof oriented toward one another and with the large dimensions thereof defining respective upper and lower ends of said acoustic transducer array.

36. The acoustic sonde of claim 1, wherein said acoustic transducer array defines upper and lower array sections each having a tapered, curved external configuration and defining ends of respective large and small dimension and being arranged with the large dimensions thereof oriented toward one another and with the small dimensions thereof defining respective upper and lower ends of said acoustic transducer array.

37. The acoustic sonde of claim 1, wherein said acoustic array is mechanically focused.

38. The acoustic sonde of claim 37, wherein said acoustic array is mechanically focused in the axial direction.

39. The acoustic sonde of claim 37, wherein said acoustic array is mechanically focused in the orthogonal direction.

40. The acoustic sonde of claim 37, wherein said acoustic array is mechanically focused by the configuration and orientation of said acoustic transducer elements.

41. The acoustic sonde of claim 37, wherein said acoustic array is mechanically focused by acoustic lensing for all acoustic transducer elements of said array.

42. An acoustic transducer array, comprising:
 (a) a plurality of acoustic transducer elements being disposed in substantially equally spaced electrically isolated relation and being arranged to define an acoustic transducer array of annular configuration;
 (b) an acoustic attenuating backing of annular external configuration being located internally of said annular transducer array;
 (c) electronic circuit means establishing electrical supply and return connections with said plurality of acoustic transducer elements and being selectively operative for individually controlled excitation of each said acoustic transducer elements of said acoustic transducer array;
 (d) a ferrite transformer block including a plurality of transformers mounted therein, each said transformer being electrically interconnected between the respective electrical supply connections and corresponding acoustic transducer elements of said array, thereby to provide enhanced electronic excitation thereof; and
 (e) means for mechanically tuning each said transformer.

43. The acoustic transducer array of claim 42, wherein:
 said acoustic transducer array is of generally cylindrical configuration.

44. The acoustic transducer array of claim 42, wherein:
 said acoustic transducer array is of generally conical configuration.

45. The acoustic transducer array of claim 42, wherein:
 said acoustic transducer array comprises generally conical sections at each extremity and a generally cylindrical intermediate section.

* * * * *